May 15, 1956  F. J. FURMAN ET AL  2,745,493
MACHINE FOR PUNCHING AND SORTING POSTAL MONEY ORDER CARDS
Filed Nov. 15, 1951  24 Sheets-Sheet 1

INVENTORS
F.J. FURMAN  H.J. KISTNER
H.L. READ  W.W. WAGNER
BY
F. W. Lownitzer
ATTORNEY May 15, 1956　　　F. J. FURMAN ET AL　　　2,745,493
MACHINE FOR PUNCHING AND SORTING POSTAL MONEY ORDER CARDS
Filed Nov. 15, 1951　　　24 Sheets-Sheet 2

INVENTORS
F. J. FURMAN H. J. KISTNER
H. L. READ W. W. WAGNER
J. W. Lowritzer
ATTORNEY May 15, 1956   F. J. FURMAN ET AL   2,745,493
MACHINE FOR PUNCHING AND SORTING POSTAL MONEY ORDER CARDS
Filed Nov. 15, 1951   24 Sheets-Sheet 5

INVENTORS
F.J.FURMAN  H.J.KISTNER
H.L.READ   W.W.WAGNER
ATTORNEY

May 15, 1956  F. J. FURMAN ET AL  2,745,493
MACHINE FOR PUNCHING AND SORTING POSTAL MONEY ORDER CARDS
Filed Nov. 15, 1951  24 Sheets-Sheet 6

INVENTORS
F.J.FURMAN  H.J.KISTNER
H.L.READ  W.W.WAGNER
BY
ATTORNEY

May 15, 1956 F. J. FURMAN ET AL 2,745,493
MACHINE FOR PUNCHING AND SORTING POSTAL MONEY ORDER CARDS
Filed Nov. 15, 1951 24 Sheets-Sheet 7

INVENTORS
F.J. FURMAN  H.J. KISTNER
H.L. READ  W.W. WAGNER
BY
J. W. Lowrieger
ATTORNEY May 15, 1956  F. J. FURMAN ET AL  2,745,493
MACHINE FOR PUNCHING AND SORTING POSTAL MONEY ORDER CARDS
Filed Nov. 15, 1951  24 Sheets—Sheet 8

INVENTORS
F. J. FURMAN  H. J. KISTNER
H. L. READ  W. W. WAGNER
BY
F. W. Lowmitzer
ATTORNEY

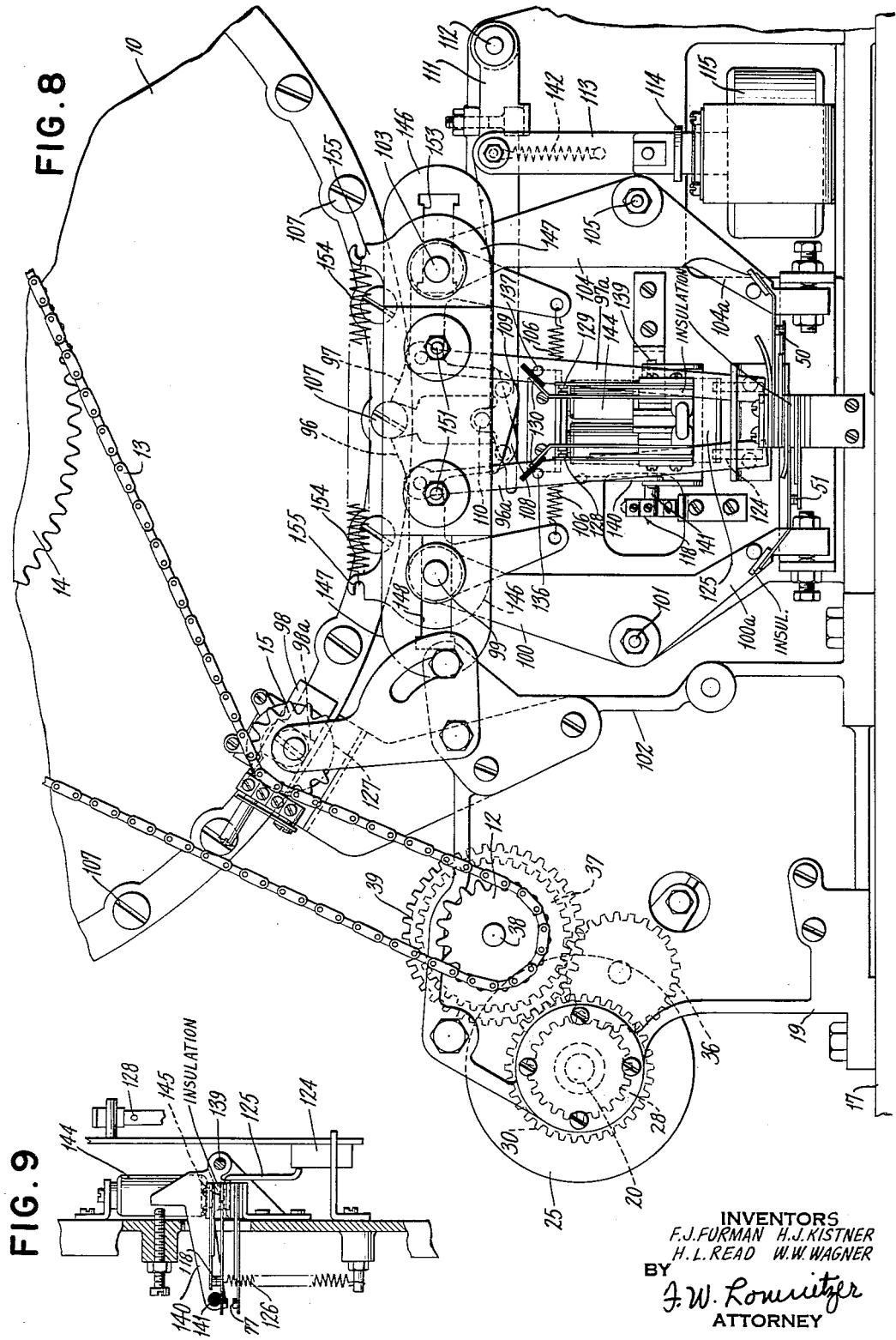

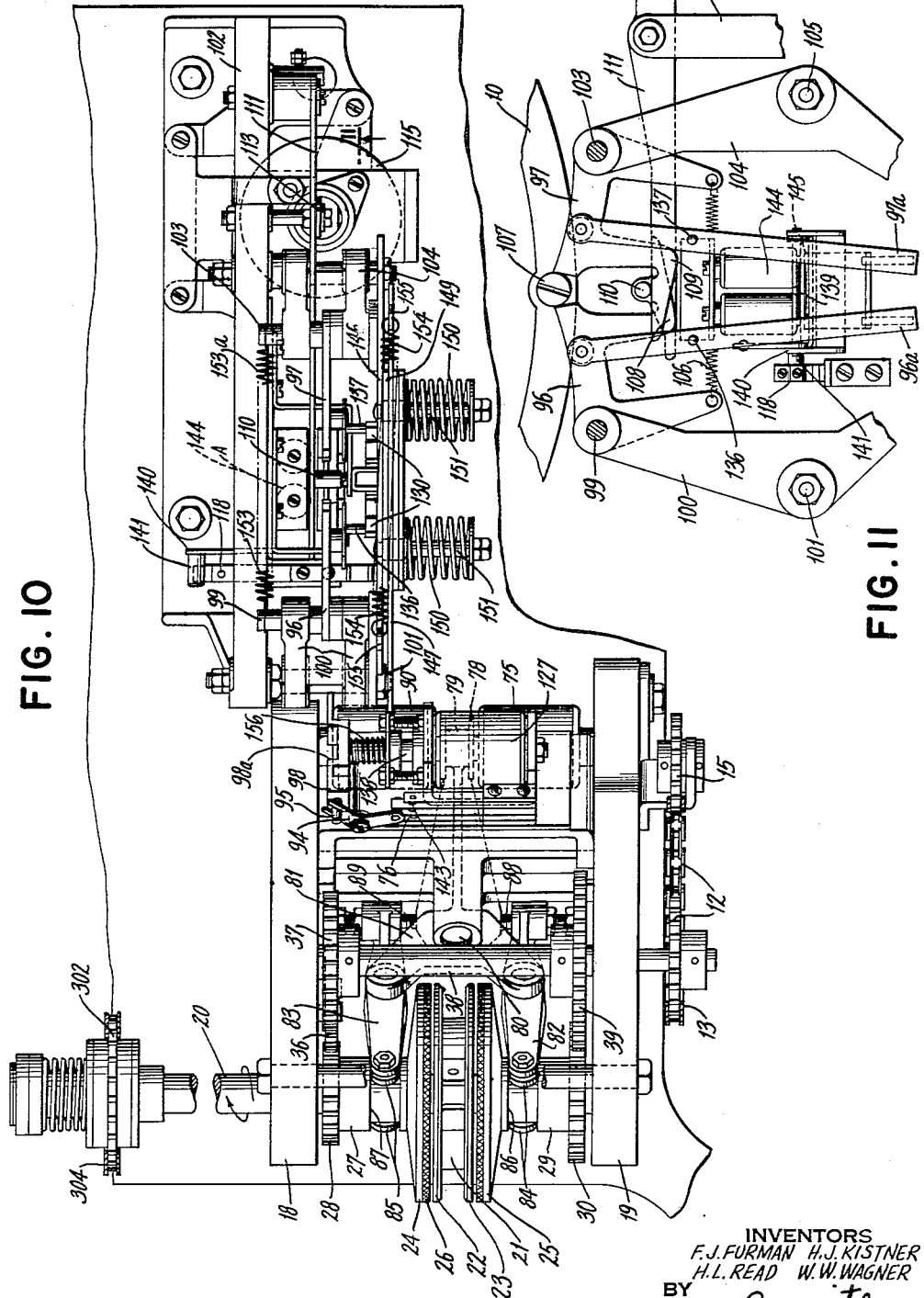

May 15, 1956   F. J. FURMAN ET AL   2,745,493
MACHINE FOR PUNCHING AND SORTING POSTAL MONEY ORDER CARDS
Filed Nov. 15, 1951   24 Sheets-Sheet 12

INVENTORS
F. J. FURMAN  H. J. KISTNER
H. L. READ   W. W. WAGNER
BY
J. W. Kornitzer
ATTORNEY May 15, 1956  F. J. FURMAN ET AL  2,745,493
MACHINE FOR PUNCHING AND SORTING POSTAL MONEY ORDER CARDS
Filed Nov. 15, 1951  24 Sheets-Sheet 14

INVENTORS
F. J. FURMAN  H. J. KISTNER
H. L. READ  W. W. WAGNER
BY
J. W. Romnitzer
ATTORNEY

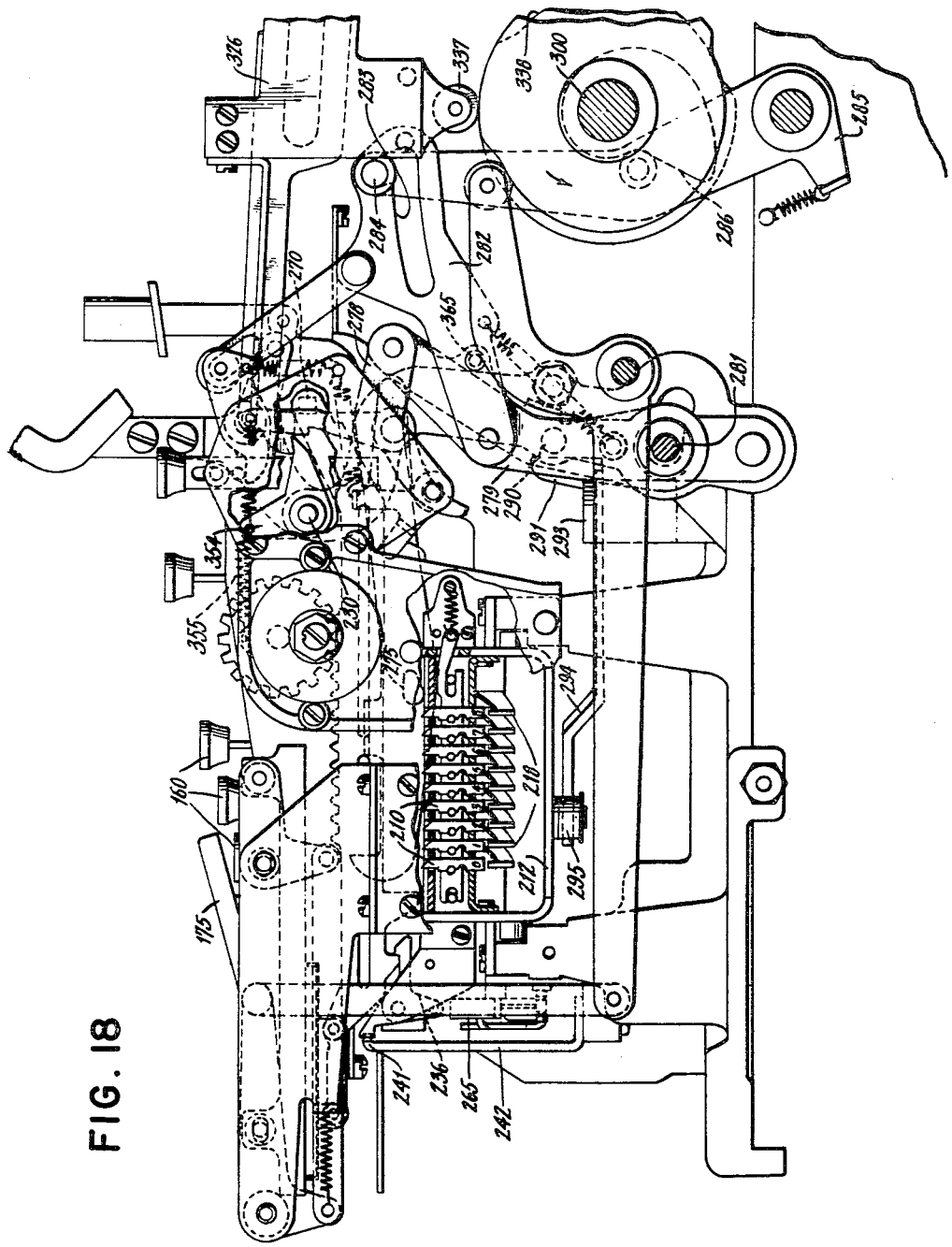

May 15, 1956   F. J. FURMAN ET AL   2,745,493
MACHINE FOR PUNCHING AND SORTING POSTAL MONEY ORDER CARDS
Filed Nov. 15, 1951   24 Sheets-Sheet 16
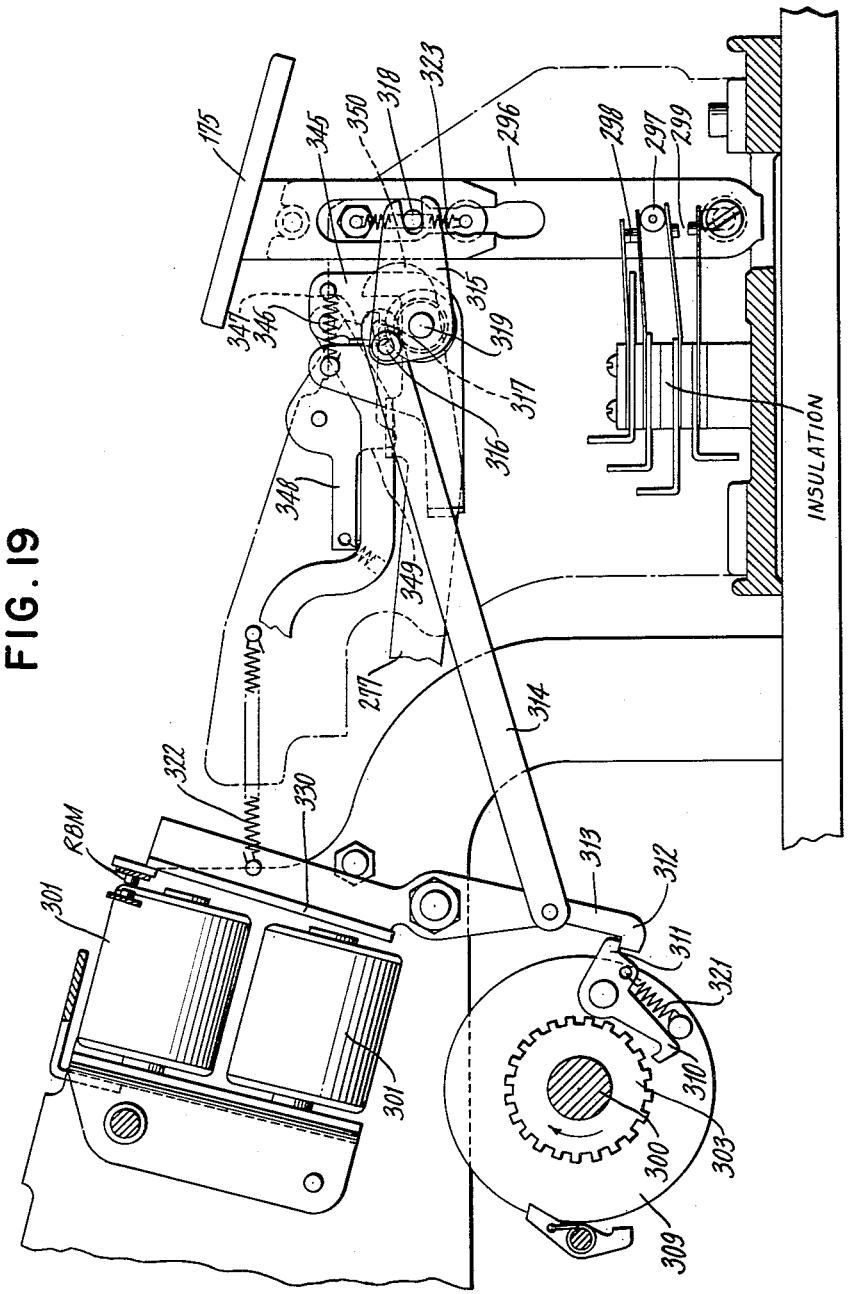
INVENTORS
F.J.FURMAN  H.J.KISTNER
H.L.READ    W.W.WAGNER
BY
J.W. Lommitzer
ATTORNEY

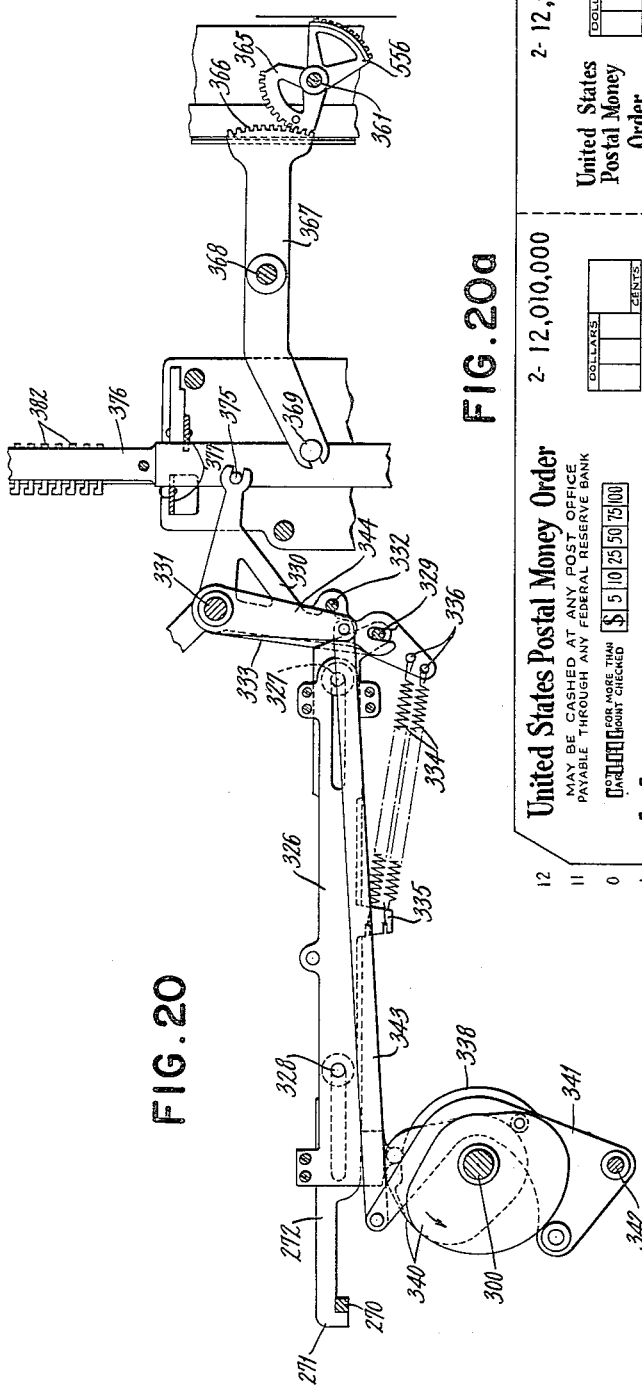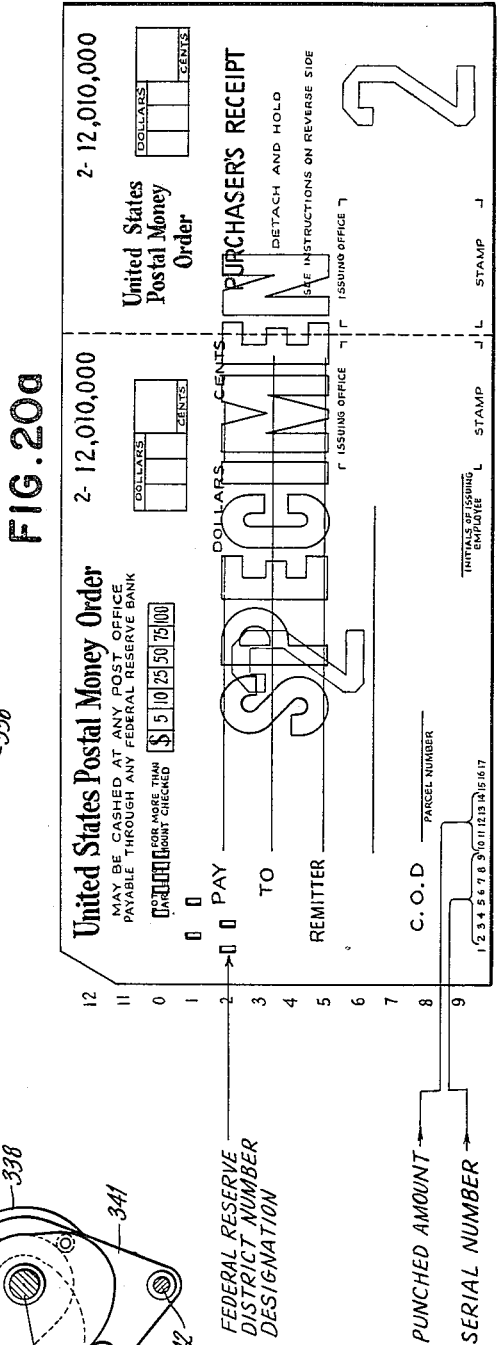

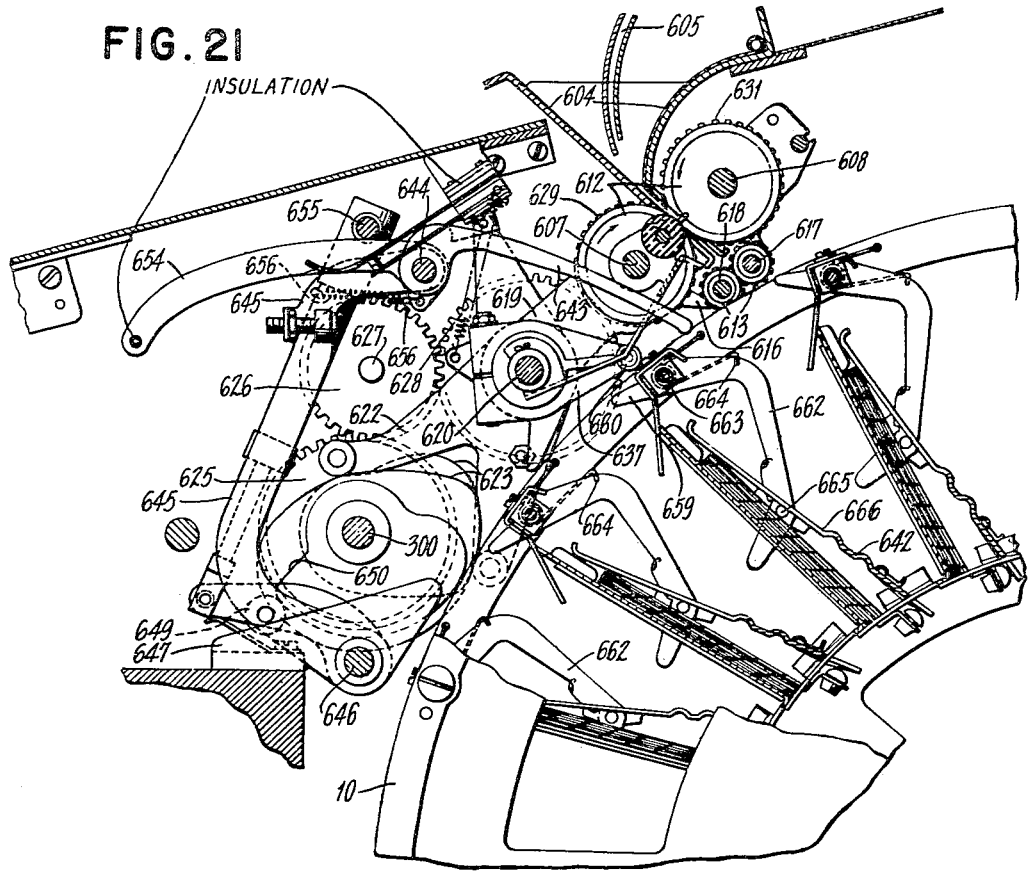

May 15, 1956  F. J. FURMAN ET AL  2,745,493
MACHINE FOR PUNCHING AND SORTING POSTAL MONEY ORDER CARDS
Filed Nov. 15, 1951  24 Sheets-Sheet 19

INVENTORS
F. J. FURMAN  H. J. KISTNER
H. L. READ  W. W. WAGNER
BY
*J. W. Lomnitzer*
ATTORNEY

INVENTORS
F. J. FURMAN  H. J. KISTNER
H. L. READ  W. W. WAGNER
BY
ATTORNEY

United States Patent Office 2,745,493
Patented May 15, 1956

2,745,493

MACHINE FOR PUNCHING AND SORTING POSTAL MONEY ORDER CARDS

Frank J. Furman and Harold J. Kistner, Endicott, Harold L. Read, Vestal, and Walter W. Wagner, Endwell, N. Y., assignors to International Business Machines Corporation, New York, N. Y., a corporation of New York Application November 15, 1951, Serial No. 256,442

4 Claims. (Cl. 164—113)

This invention relates to combined card punching and sorting machines and has for its main object the incorporation of a manually controlled card punching mechanism in the form of combined sorting and accounting machine shown in the patent to F. L. Fuller et al., No. 2,142,352, issued January 3, 1939, herein known as the "basic machine."

It has been proposed heretofore, in the patent to Samuel Brand, No. 2,161,612, issued June 6, 1939, to provide the machine of the form shown in the Fuller et al. patent, No. 2,142,352, with a card punching attachment, but the latter does not fulfill all the requirements for which the present machine was devised.

The present machine is particularly useful in processing cards which are in the form of postal money orders, written out in the respect that the payee, payor, amount of the money order are set forth, and prepunched to identify the "Federal Reserve Bank District" through which the money orders should clear. The money orders are also prepunched to designate the serial number of the card and have five blank columns allocated to receive perforations by the present punching mechanism to designate the corresponding amount on the money order written by the issuing clerk.

A single column is allocated to represent twelve Federal Reserve districts, and in accordance with the Federal Reserve district number designation sorting compartments selected thereby are adapted to receive automatically fed punched cards.

It is the main object of the present invention to provide in the basic machine provisions for punching cards by a cyclic operation of the machine, selecting a sorting compartment according to a prepunched designation on a card, and by the cyclic operation of the machine feeding the punched card to the selected sorting compartment.

It is a further object of the present invention to automatically feed said money order cards in succession from a magazine, and each to a viewing station where the operator may read the written amount and depress corresponding keys to effect a subsequent punching of the amount, sense and store up on storing means the district number designation, and select compartments under control of the storing means.

A further object of the invention is to devise a punch selector under control of a ten-key keyboard of the basic machine shown in the Fuller et al. patent, No. 2,142,352, rendering it possible to effect a selection of the punches, the operation of the punches, and the feeding of a punched card in a cyclic operation of the basic machine.

A still further object of the invention is to cause a concomitant operation of the card picker and feed rolls associated with the viewing station with the feed rolls of the card punching mechanism, rendering it possible to feed in each cycle of the machine a following card to the viewing station during the punching of a card under control of the previously depressed keys of the ten-key keyboard.

A still further object of the invention is to devise the sequence of operation by the operation in such time saving manner that the drum carrying the sorting compartments is rotated under control of the designation number storing means during the time that the ten-key keyboard is being manually operated, and to further interlock the motor release bar which initiates cyclic operations of the machine so as to prevent operation of the motor release bar until the sorting drum has come to rest with a selected compartment in card receiving position, and to prevent rotation of the sorting drum to a new position until the cycle or cycles of machine operation are completed.

In the present machine, after a "run-in" cycle, which is the first cycle upon starting the machine, two cycles always ensue, the first of which cycles is a card punching cycle, and the second a card feeding or sorting cycle, and it is a further object of the invention to provide control means responsive to the position of a card in the punching mechanism for automatically continuing with the second cycle to feed the card out of the punching mechanism to the preselected compartment.

A still further object of the invention, which is more concerned with the details of the construction of the card punching mechanism, is to provide card feeding rollers in the form of "slip type" which functionally feed the card in a viewing station against a card stop, and in the punch station against another card stop; the provision of card levers, associated contacts and electrical circuits for insuring the proper performance of the machine; electromagnetic means for insuring the proper position of a card in the punching mechanism before punching, and detecting means for detecting the improper position of a card with respect to the punches with associated signal means for signaling the operator of this condition.

A further object of the invention is to provide a storing means of the electrical relay type, the relays of which are energized singly or in combination to store up a district number designation. The circuit network for energizing relays singly or in combination may include selenium rectifiers which possess unidirectional current flowing characteristics which enable a single electrical impulse to energize a plurality of storage relays, but prevent the possibility of "back circuits" to prevent energization of unwanted relays. Such circuit network eliminates electrical relay contacts previously employed to energize relays in combination, and simplifies the electrical circuits.

A further object of the invention relates to the card sorting mechanism which enables cards of one designation to be directed to sorting compartments successively, that is to say, when one sorting compartment is filled, the adjacent empty compartment is then selected to receive cards having the same designation. This requirement is due to the fact that money order cards having a certain designation, such as the local Federal District where the machine is to be used, appear in greater number than the cards having other designations, and in the present machine ten sorting compartments are allocated to receive them in succession, as the preceding one is filled.

In this connection it is an object to devise a sorting mechanism wherein cards having a plurality of different designations are sorted in as many sorting compartments, but cards having a certain other designation are directed to one of a plurality of other sorting compartments, dependent upon the filled-up condition of a preceding utilized compartment.

A still further object is to devise a detecting device common to all of the compartments which detects the filled-up condition of any compartments and which functions to render the machine inoperative when certain of the compartments are filled up, but causes the selection of another compartment when one of a plurality of other compartments which are to be used in succession is filled up.

Another object is to render the machine inoperative when the last of the plurality of compartments which are to be used in succession is also filled up.

The improvements in the card sorting mechanism are the subject of an application of F. J. Furman, H. L. Read, H. J. Kistner and W. W. Wagner, Serial No. 272,822, filed February 21, 1952, and are claimed therein.

While it is preferred to utilize the machine when it embodies all of the above described features of construction, some of these features may be used alone and incorporated in similar or dissimilar types of machines. For example, the manner of selecting sorting compartments may be used in sorting machines per se, and would not necessarily have to be incorporated in a machine which also punches these cards. Again features of construction of the punching mechanism may be incorporated in machines which do not have provisions for sorting cards, etc.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a view in side elevation of a well known form of combined check sorting and accounting machine shown in the patent to F. L. Fuller et al., No. 2,142,352, in which the present punching mechanism is preferably incorporated for punching and sorting the cards.

Figure 6A:
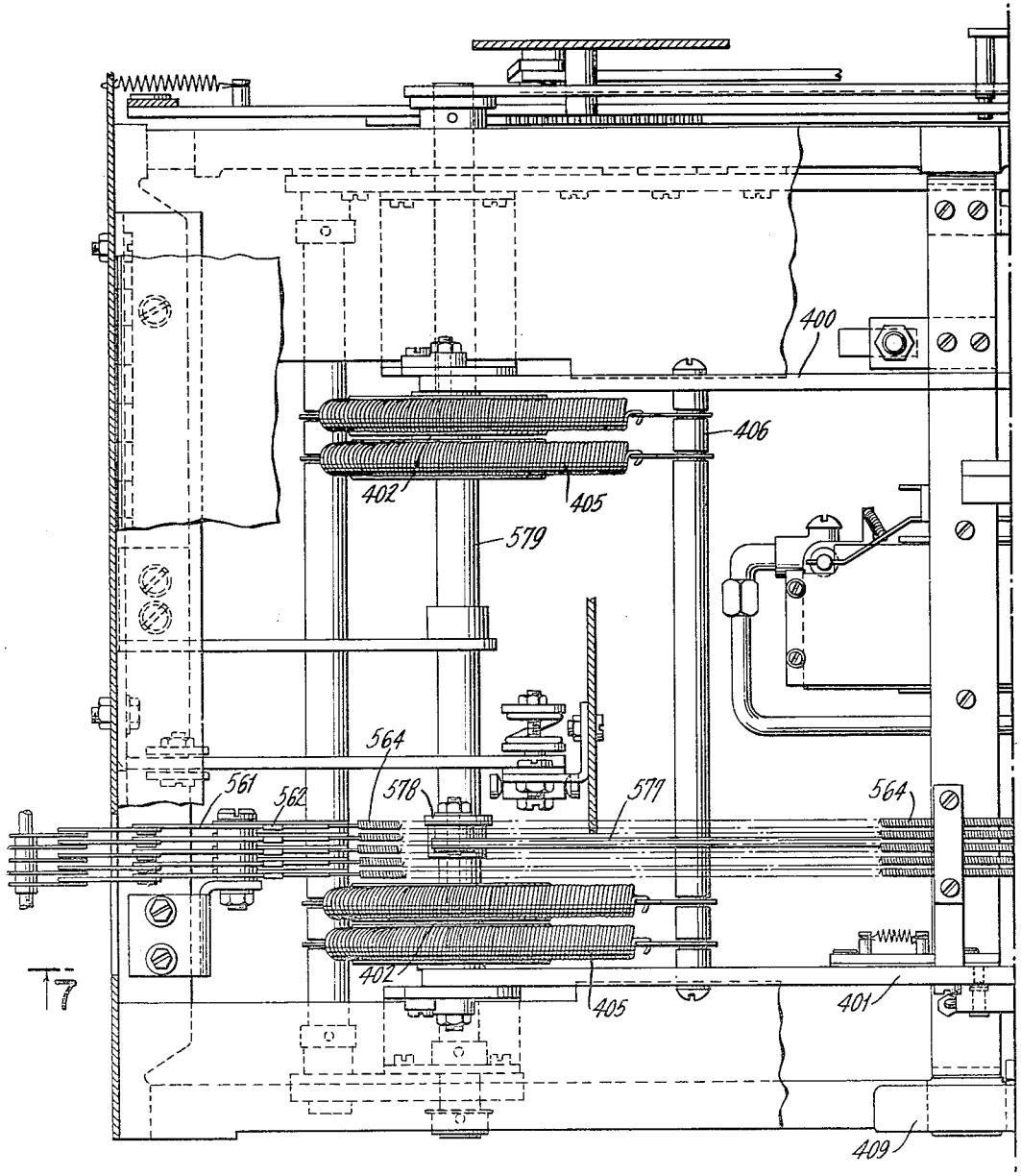
Figure 6B:
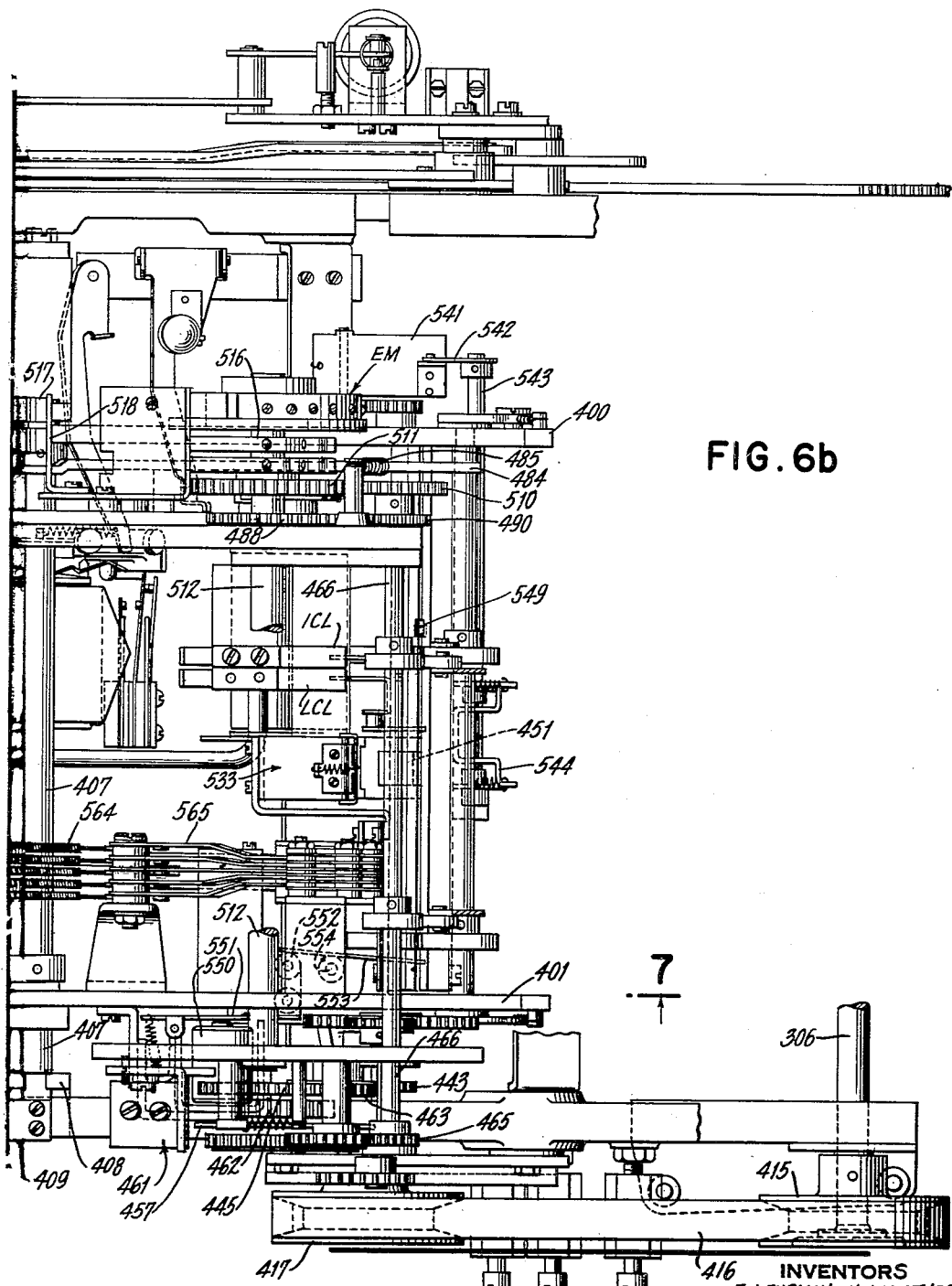

Figs. 6a and 6b when assembled in the named order show the manner of assembling the card punching unit (without the card feed mechanism being shown) on the frames of the basic machine.

Figure 7:
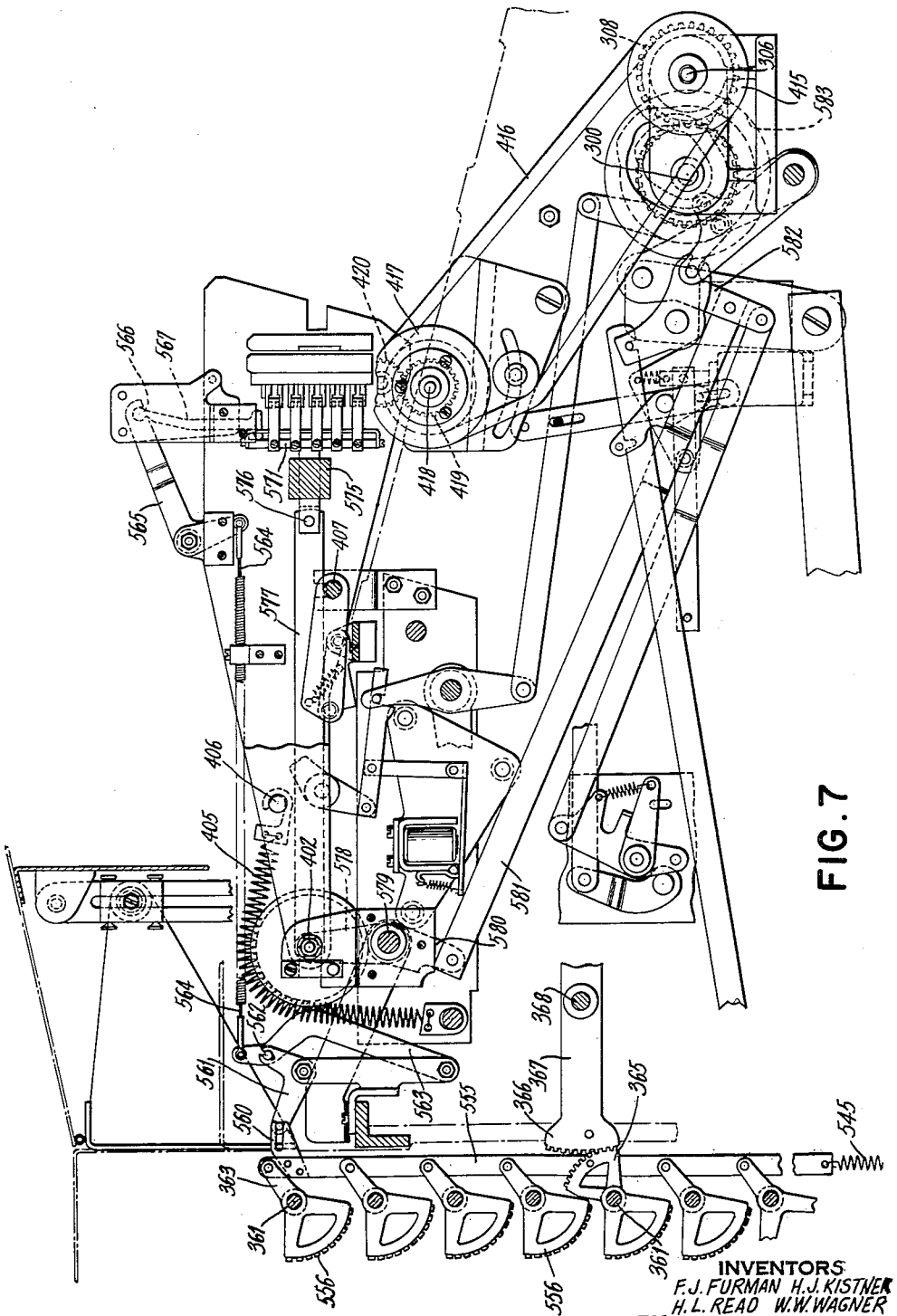

Fig. 7 is a view in side elevation showing the connections from the differentially set segments of the basic machine to the selectors for selecting the punches, as well as showing the manner of obtaining a belt drive from the main drive of the basic machine to the punching mechanism and card feeding mechanism.

Fig. 8 is a view in side elevation of parts arranged at the bottom of the machine and shows particularly the stopping devices for the sorting drum.

Fig. 9 is a detail view of certain contact controlling devices associated with the drum stopping devices.

Fig. 10 is a plan view of the parts shown in Fig. 8.

Fig. 11 is a detail view of certain parts of the sorting drum stopping devices.

Figure 12:
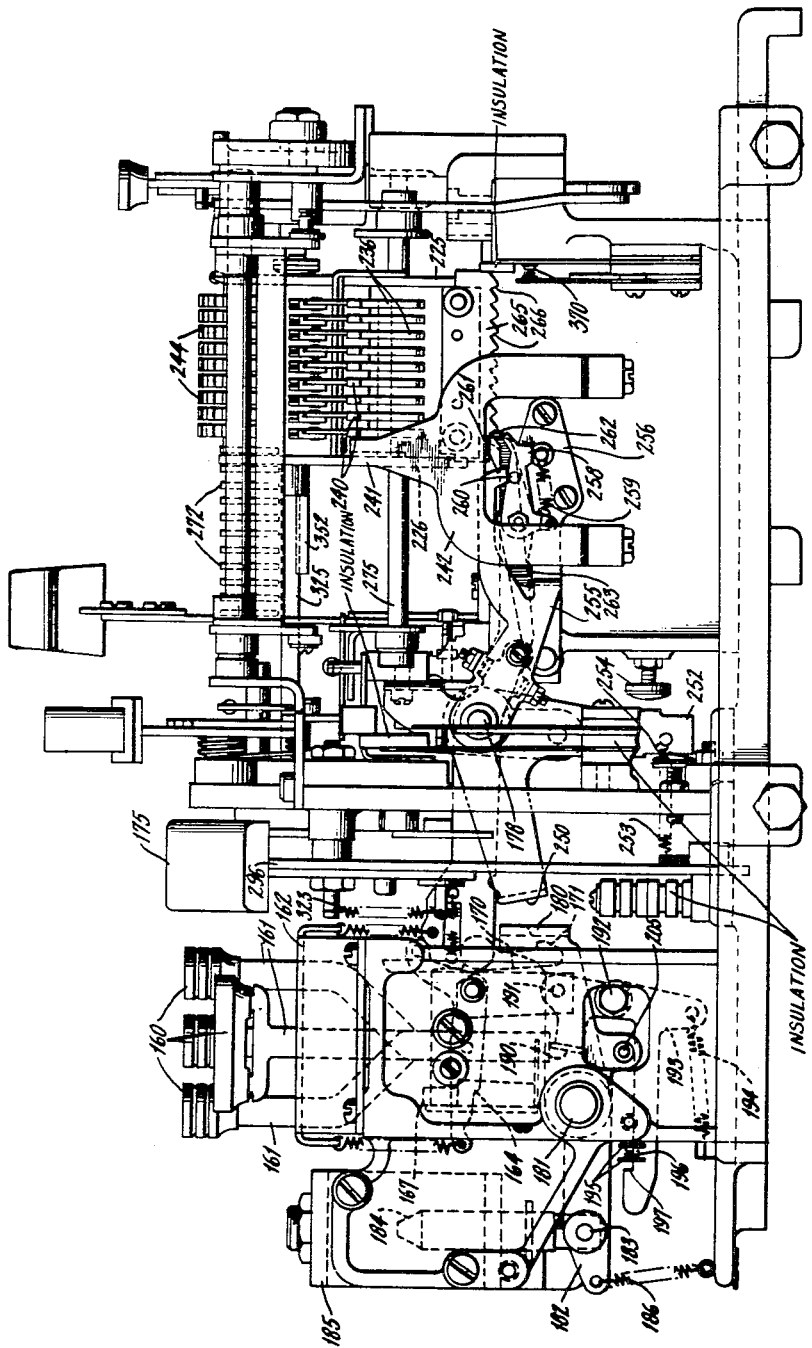

Fig. 12 is a view in front elevation of a form of ten-key keyboard mechanism which may be used for setting up the amounts to be punched on the postal money orders.

Figure 13:
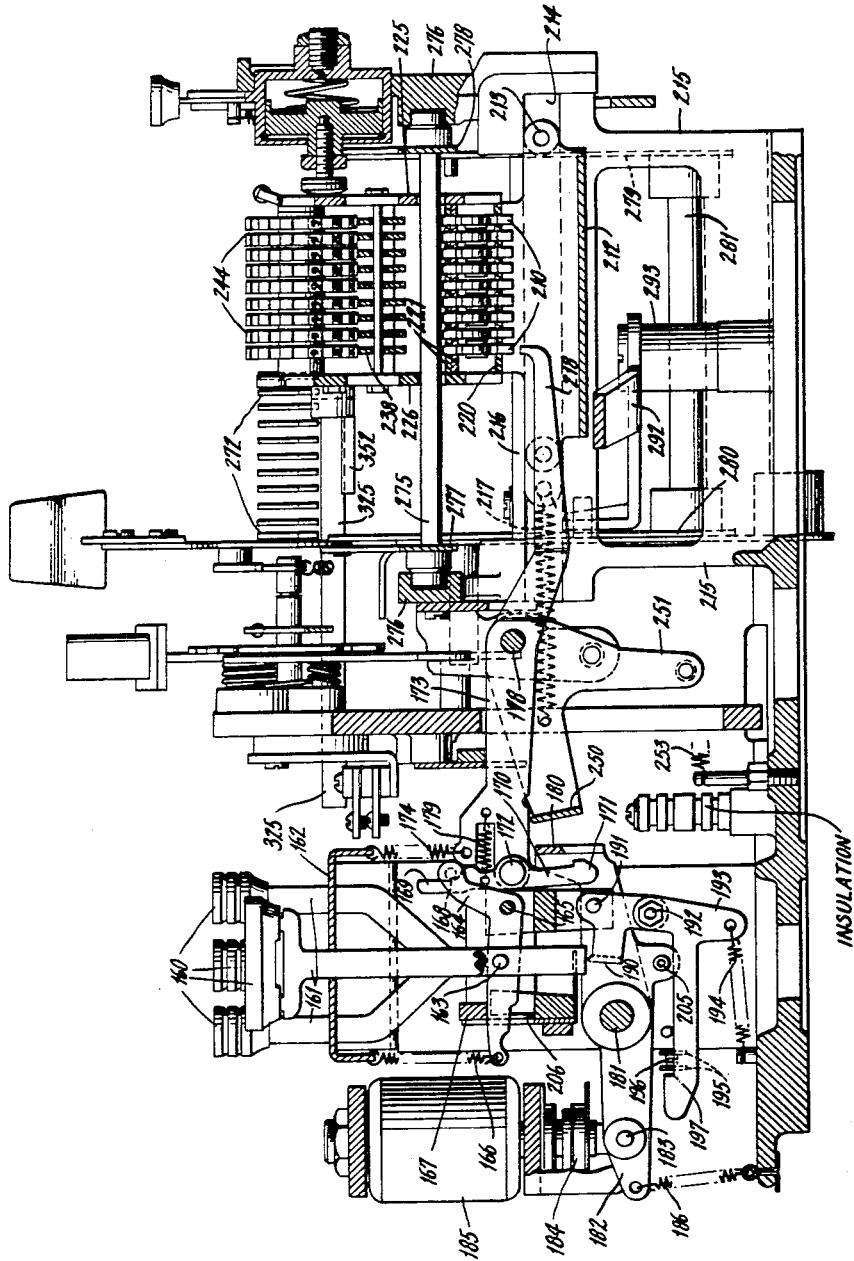

Fig. 13 is a transverse sectional view of the ten-key keyboard mechanism.

Figure 14:
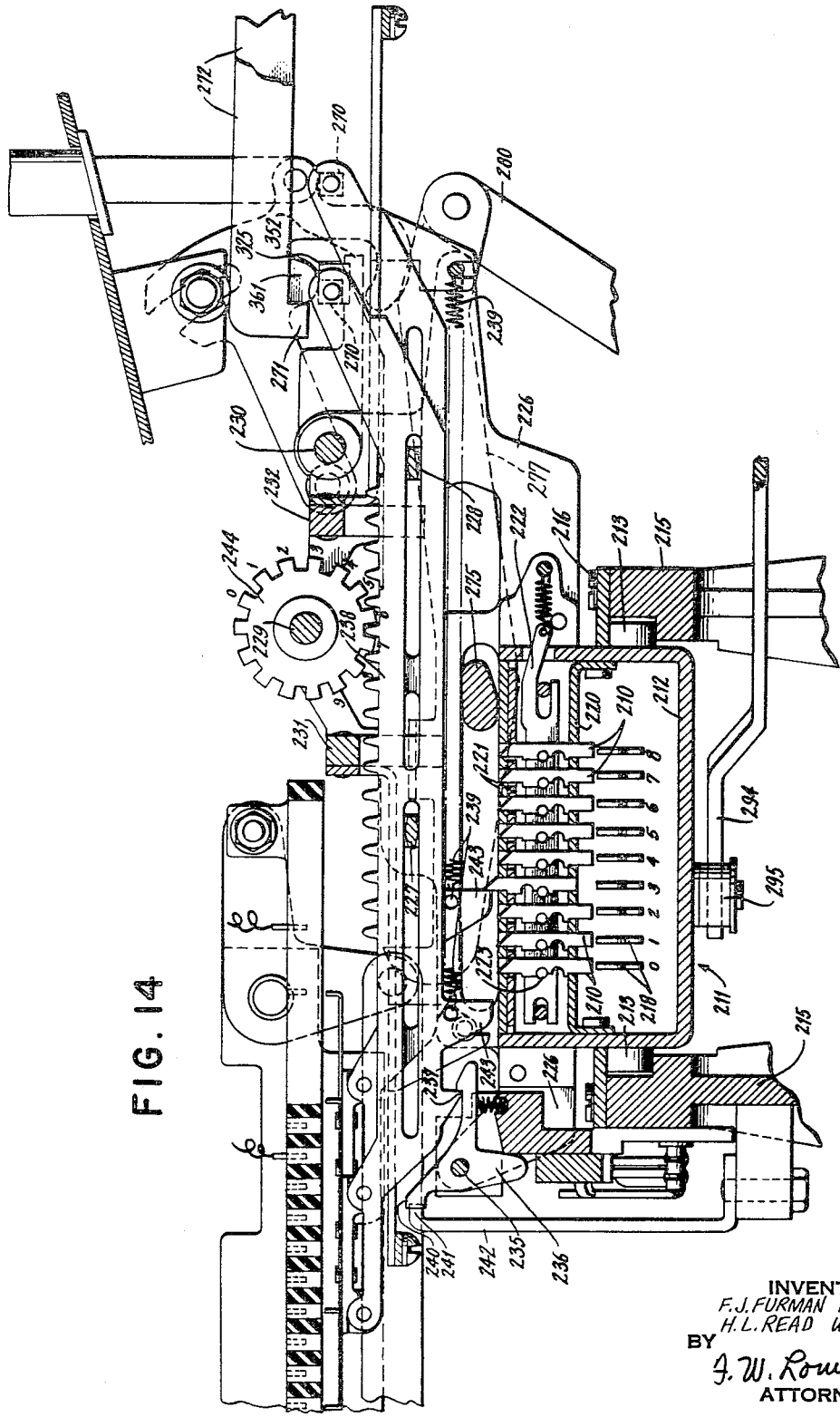

Fig. 14 is a longitudinal sectional view of the ten-key keyboard mechanism.

Figure 15:
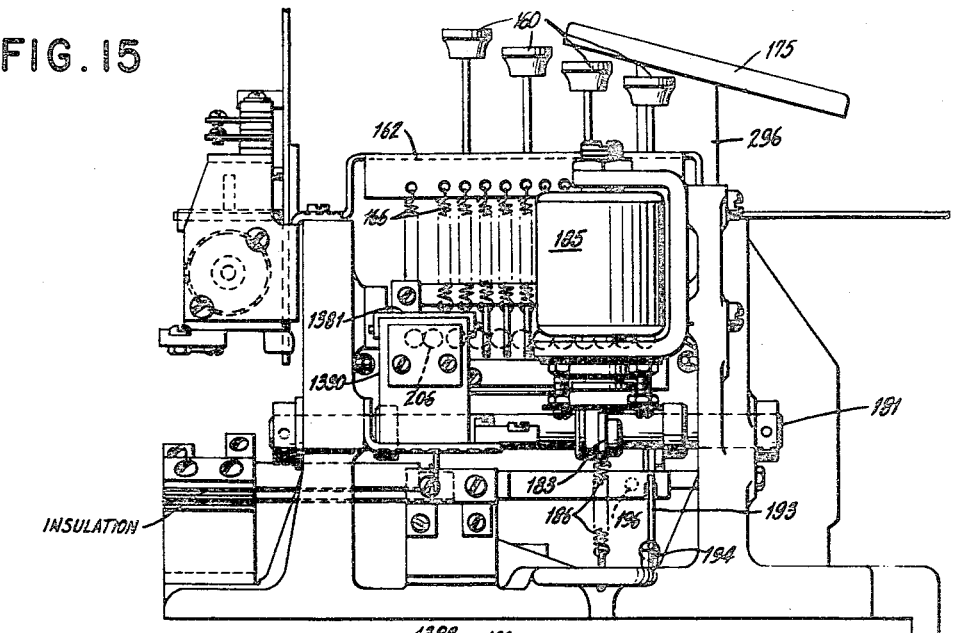

Fig. 15 is a view in side elevation of the left side of the ten-key keyboard mechanism.

Figure 16:
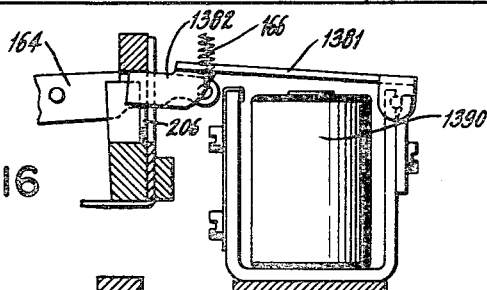

Fig. 16 is a detail view of the electromagnetically controlled key locking mechanism.

Figure 17:
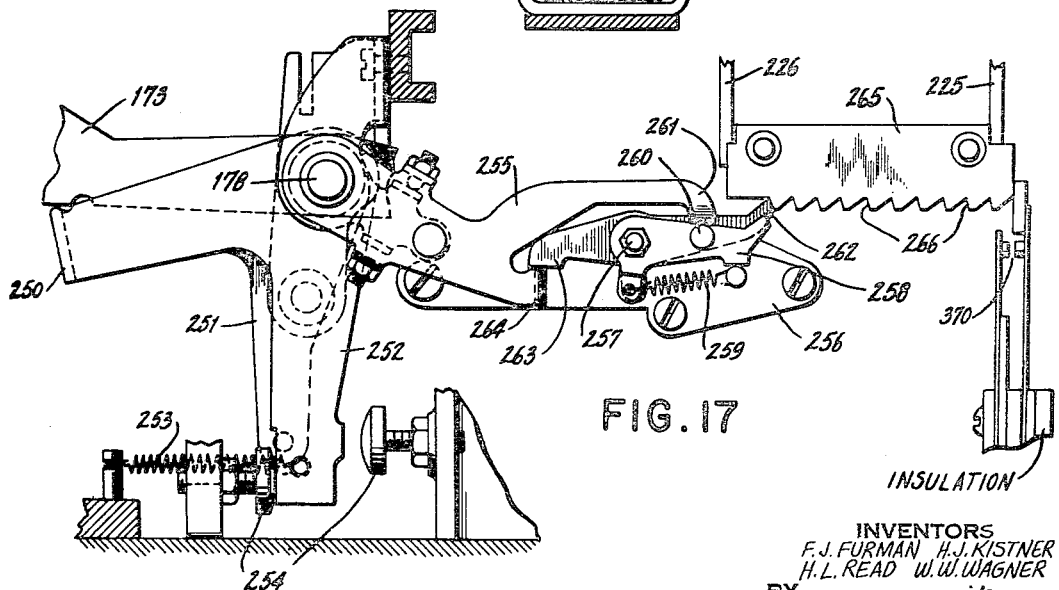

Fig. 17 is a detail view of the escapement mechanism for the ten-key keyboard.

Fig. 18 is a view in side elevation of the right-hand side of the ten-key keyboard mechanism.

Fig. 19 is a view which shows primarily the motor release bar and associated magnetic clutch release mechanism.

Fig. 20 is a view showing the means for setting type segments under control of the ten-key keyboard mechanism, which segments have, in the present machine, connections for setting the card punching mechanism.

Fig. 20a is a view of a postal money order punched card.

Fig. 21 is a sectional view showing a few of the sorting compartments, the check feeding mechanism therefor, and its association with the feed chute of the card punching mechanism of the present invention.

Fig. 22 is a view showing some of the parts of Fig. 21, but in operated position.

Figure 23:
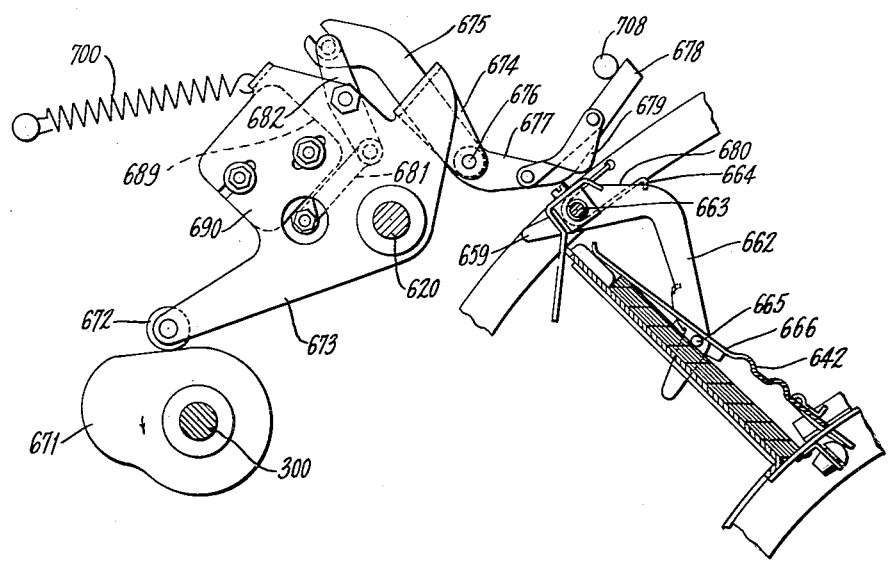

Fig. 23 is a view showing the full pocket detecting mechanism associated with the check sorting compartment, and which in the present invention causes the selection of a successive empty compartment when a preceding compartment has been filled.

Figure 23A:
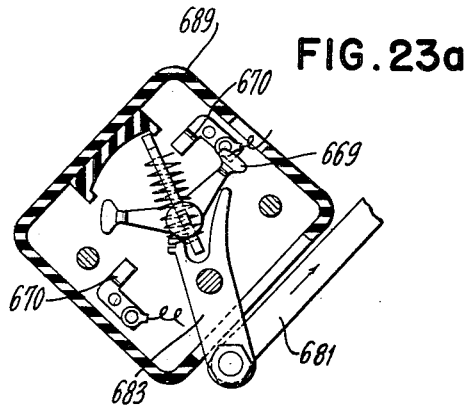

Fig. 23a is a detail view of the full pocket indicating switch.

Figure 24:
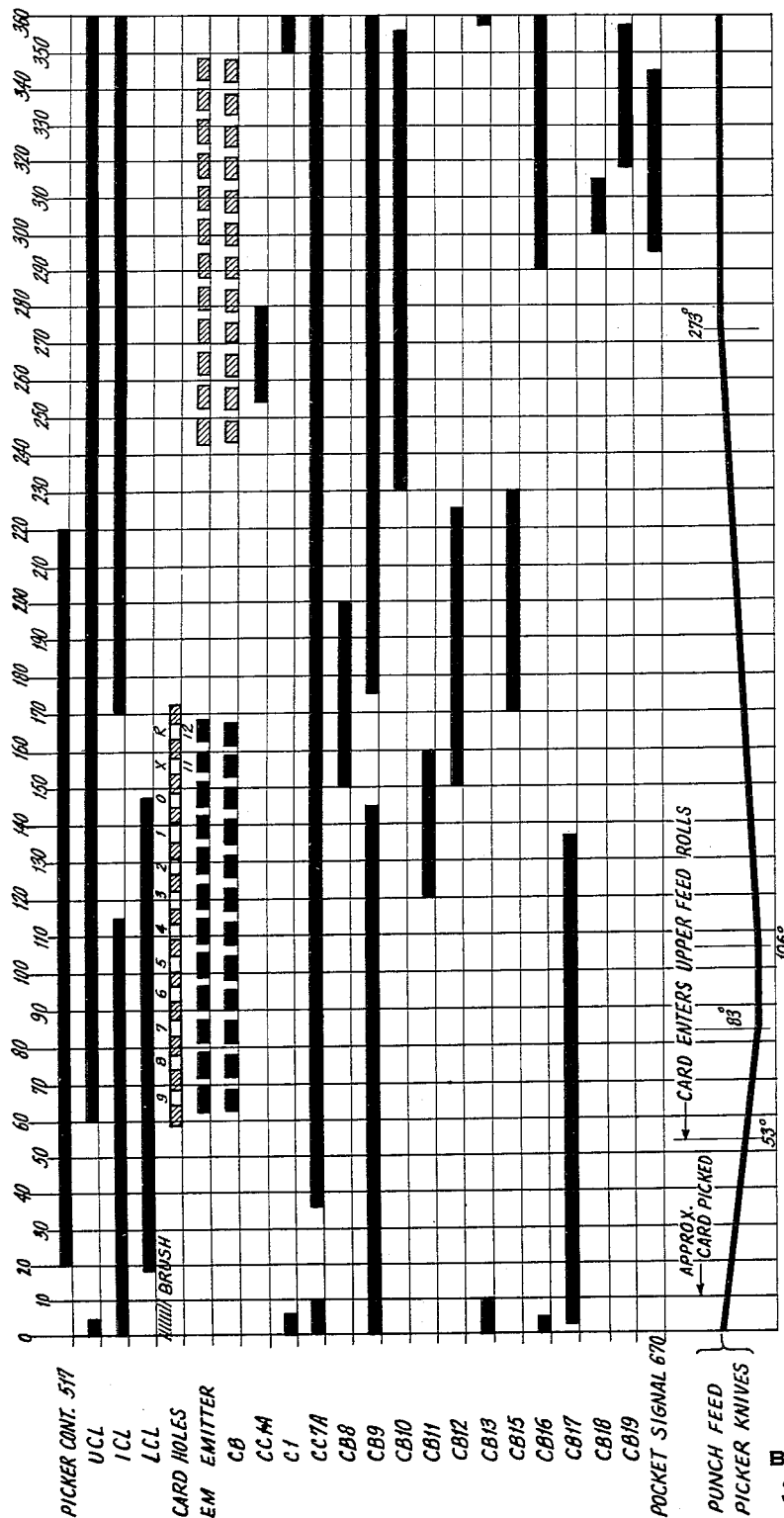

Fig. 24 is a timing diagram.

Figure 25A:
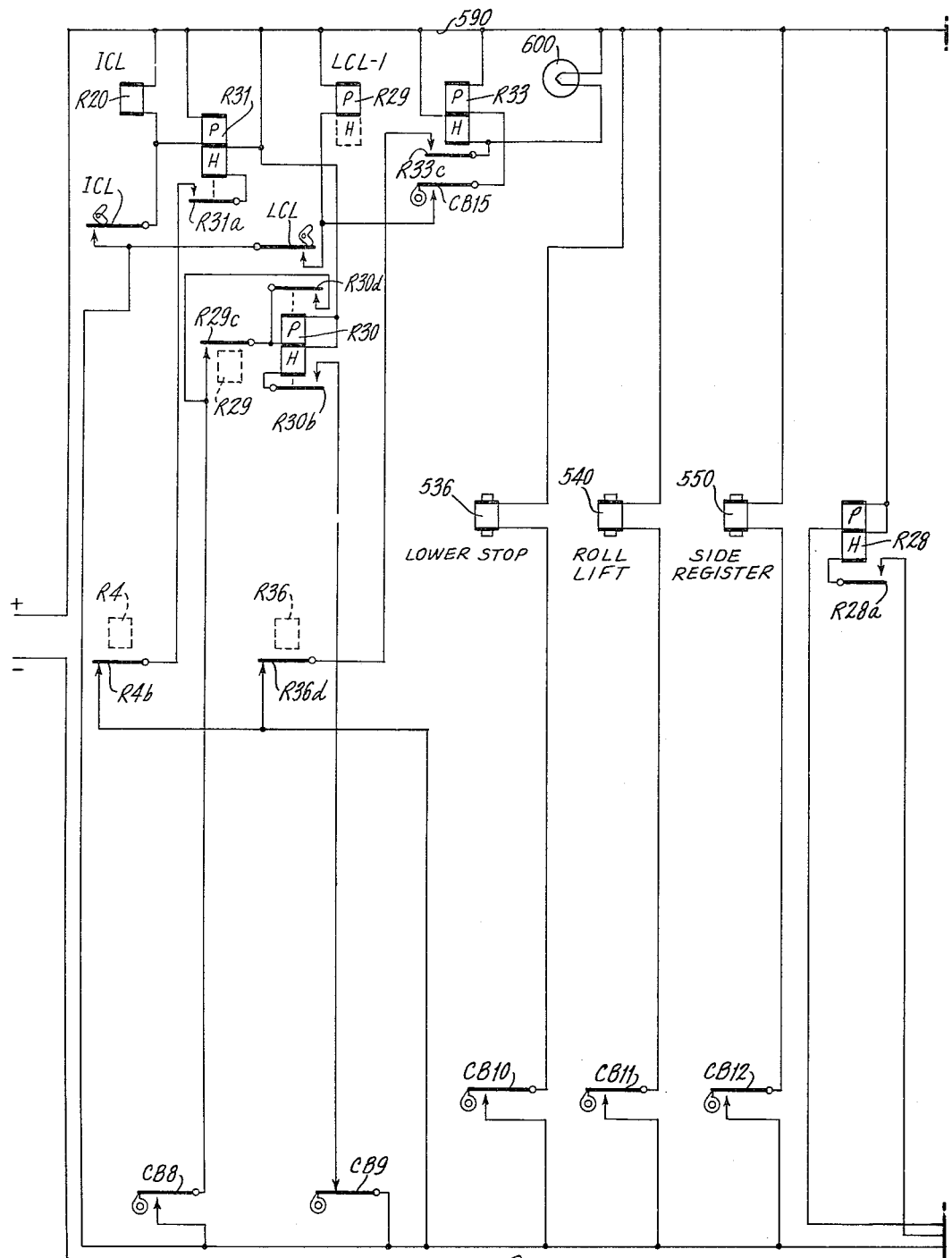

Figs. 25a, b, c and d, when assembled in the named order constitute a wiring diagram.

*General description and operation of the machine*

As previously indicated, the present improvement includes a card feeding and card punching mechanism incorporated in the basic machine shown in the patent to F. L. Fuller et al., No. 2,142,352.

While not restricted to the particular use for which the present improvements have been designed, the principal use of the present improvements is to process postal money orders in the form of punched cards. Fig. 20a discloses the general form of such postal money order card and consists primarily of two parts; a receipt stub part at the right which is detached and retained by the person purchasing the postal money order, and a card part having 51 columns, certain of which are prepunched and others subsequently punched by an operation of the present machine. The larger 51-column portion contains line spaces for indicating the payee, remitter, and other information written in or marked by printing stamps by the issuing money order clerk at the postal money order window. The first card column is prepunched to receive a hole in one of twelve index point positions to represent the number of the "Federal Reserve Bank District." It should be understood that there are 12 regional post offices which conform generally to the 12 Federal Reserve Bank Districts and one of the twelve Federal Reserve Bank Districts is represented on each card by a digital punching in the 1 through 12 index point positions in card column No. 1. The serial number of each money order is prepunched in columns 2 to 9, inclusive which control printing means in a record controlled accounting machine to list the serial numbers of the cashed money orders. A further use is to determine by collating machines whether forgeries exist which would be indicated by a duplicate serial number, or none at all.

The amount of the postal money order is, of course, written in by the clerk and by means of the present punching mechanism the amount set up in the machine is automatically punched in card columns 10 through 14 as the card passes through the machine and prior to the sorting of the card.

After payment at banks or post offices the money orders are then cleared and processed at the Federal Reserve Bank by the present machine. A group of cashed money order cards is placed in the hopper or magazine of the present machine and upon depression of the motor release bar to cycle the machine each is automatically fed to a viewing station. During this time the "District Number" designation or hole which was punched in the postal money order card is sensed and stored up by relays in the present machine until such time that it is read out to control the predetermined extent of rotation of a sorting drum to select a pocket determined by the Federal Reserve District number designation. For the first card through the machine the sorting drum will be rotated at the termination of the cycle that the district number designation is read. For succeeding cards the sorting drum is not changed to a new position until punching and sorting of the preceding card have been completed, which takes two cycles, and therefore its position is changed after the second cycle.

With the card in the viewing station the amount written on the card is read by the operator and set up under control of the ten-key keyboard mechanism of the basic machine. An interlock is provided to compel this operation prior to depression of the motor release bar. For the first card fed from the magazine a depression of the motor release bar causes a single cycle of the operation of the machine but thereafter a depression of the motor release bar following the ten-key keyboard operation causes the machine to take two cycles. During the first of the two cycles the card which was at the viewing station is fed to the punching station where it is stopped and shifted laterally to properly register the columns to be punched with the punches. By means of printers and totalizers in the basic machine the setup on the ten-key keyboard is transferred to said printer to be printed on what is known as the "main control tape," as well as a selected compartment tape and at the same time the amount is entered into a grand totalizer and a selected compartment totalizer. This operation is substantially the same as in the basic machine to which reference may be had for further details of information.

In the present machine the setting of the printing mechanisms also sets punch selectors so as to cause the punching of the amount on the card in card columns 10 through 14. There is a positive mechanical connection between the printing-setting mechanism and the punching mechanism so as to insure that the amount which has been punched agrees with the amount which is printed and entered in the respective totalizers. After the card punching has been completed the card stop located in the card punching mechanism is released and the card then advances to the chute of the basic machine. The presence of a card in the punching mechanism causes means to be responsive to continue with another cycle which automatically feeds the card through the chute and by feed rollers in the basic machine to the selected compartment.

During the cycle that a card is advanced from the viewing station to the punching station another card is fed from the magazine to the viewing station where it is stopped by a card abutment and the preceding card is released from the punching mechanism to be ultimately sorted into the preselected compartment. The drum then rotates to a new position during which the amount on the second card is then set up by the operator in the ten-key mechanism and the motor release bar operation is then repeated.

In view of the fact that each machine is allocated to clear postal money orders having the same district number designation as the Federal Reserve District in which the machine is located for processing postal money orders, there will be a greater number of correspondingly designated punched cards and are referred to herein as "local items." If only one sorting compartment was allocated for receiving such local postal money orders it is obvious that the operator would be required to empty this single sorting compartment many times during a normal day's operation. Therefore, while one sorting compartment is allocated for each of the foreign Federal Reserve Districts, which will provide ample sorting capacity for such foreign money orders, the present machine provides ten sorting compartments for local items. These sorting compartments are filled in succession as the preceding sorting compartment is completely filled. Responsive to the filling of each compartment the next unfilled sorting compartment will be automatically selected to receive local money orders without any attention by the operator until the tenth local item sorting compartment is completely filled. This is designated to the operator in the same manner that the sorting compartments allocated for foreign districts are indicated as filled. The indication that the tenth local item sorting compartment is filled requires that the sorting compartment be emptied by the operator.

In the present description it is assumed that the local district designation is the Second Federal Reserve District which necessitates for sorting compartment selection purposes a card hole at the 2 index point position. However, in the present machine instead of selecting the No. 2 sorting compartment, sorting compartments 13–22, inclusive, are selected in succession by the 2 hole. Because of the careless handling of money orders beyond the control of Post Office Departments it is assumed that a certain number will be found to be so mutilated and torn that they cannot be properly punched and passed through the machine. Accordingly, such postal money order cards are sorted on a manual basis and manually placed in a sorting compartment selected by the depression of a selector key on the compartment selector keyboard of the basic machine. Assuming, it is the No. 2 key, sorting compartment No. 2 will be brought into position and the operator may place the mutilated card at the side of the machine into the compartment which is now in position for endwise insertion of the punched card. For these cards, duplicate cards may be punched by conventional key-operated card punches.

In this connection sometimes the mutilated cards are in such condition that they cannot be punched but can, nevertheless, be manually placed in the regular card receiving chute and fed into the No. 2 compartment, as explained above. This will take care of cards which are in this condition. Of course, such mutilated cards would not be punched but this can also be taken care of by punching in a conventional key controlled card punching machine but, if impossible, a duplicate 51-column card may be punched and this used as a substitute for the original postal money card for the subsequent processing through record controlled accounting and listing machines.

A further feature is that if the district number designation normally punched in card column No. 1 is not read, or present, the compartment selecting mechanism is so arranged that compartment No. 2 will be automatically selected and such card will be fed therein.

The above is a general description of the purpose and operation of the present improvements and is given in order to better understand the more detailed description which now follows:

*Support frames*

Figure 2:
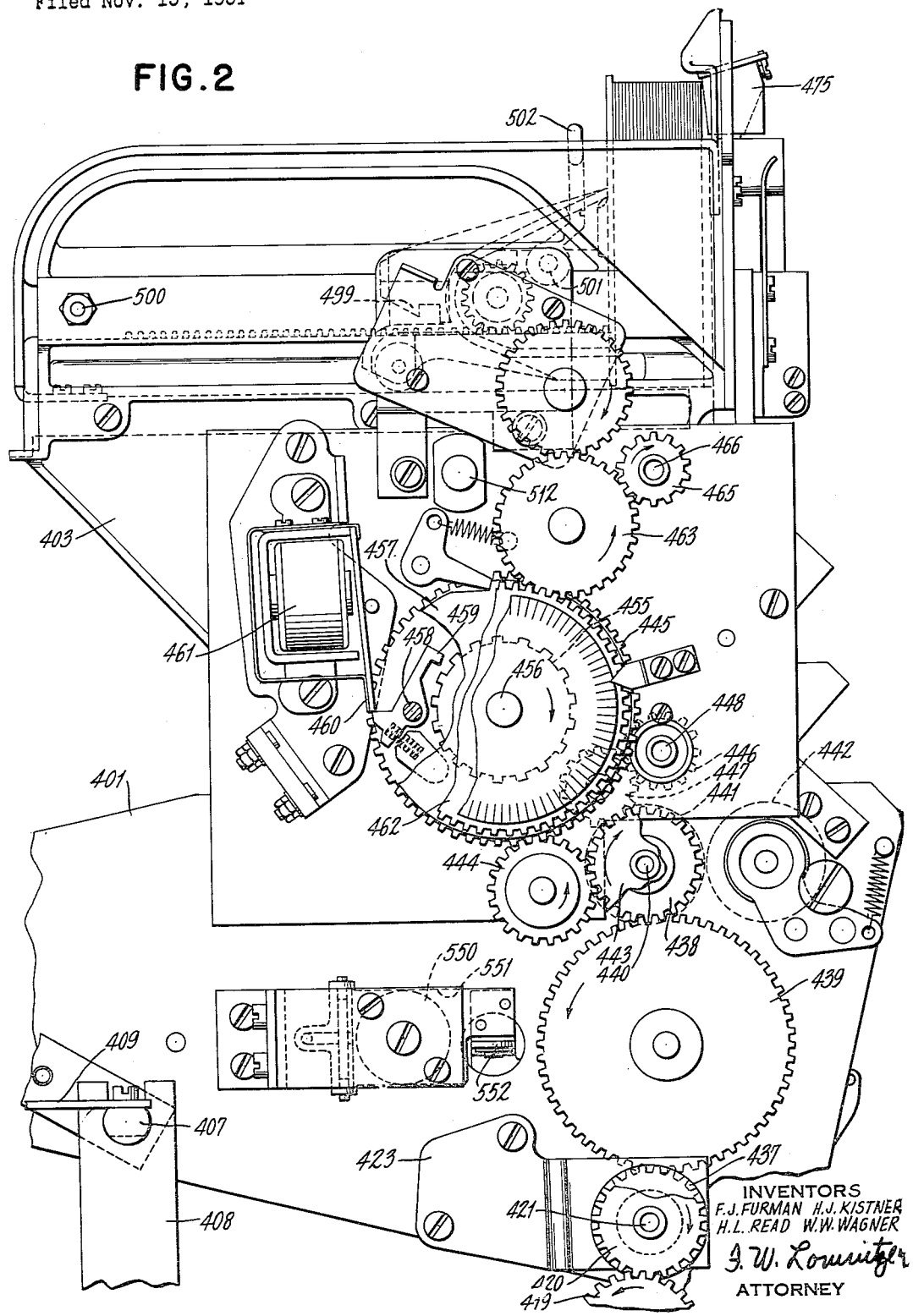
Fig. 2 is a view in side elevation of the left side of the card feeding and card punching mechanism, showing mainly the drive gears and the one revolution clutch.

The punching unit (Figs. 2–7) is arranged above a combined check sorting and accounting machine of the type shown in the patent to F. L. Fuller et al., No. 2,142,352, issued June 3, 1939, and is so arranged that cards punched by the present punching mechanism are fed into the check receiving chute of the basic machine to be sorted into sorting compartments selected by the prepunched holes in the cards. The check feeding mechanism consists of a unit, the side frames 400 and 401 (Fig. 4) of which are pivotally mounted on a pair of short studs 402 (Fig. 7) of the basic machine. Suitable cross shafts and transverse members provide a rigid framework for carrying the parts. A pair of side frames 403 (Figs. 2 and 3) are attached to the side frames 400, 401 by brackets 404 (Figs. 3 and 5) and these frame plates carry most of the card feeding mechanism, the card magazine, etc. The above type of mounting enables the whole unit to be rocked about shaft 402 for inspection and is held in such position by counterbalancing springs 405 (Fig. 7), one end of each being anchored to a rod 406 carried by said frame plates 400, 401.

A rod 407 (Figs. 2 and 7) passing through the side frames 400, 401 fits in brackets 408 secured to parts of the basic machine (Fig. 6b). The rod 407 has flattened ends to enable the rod to enter the slot of each bracket, and a half turn of said rod facilitated by a finger piece 409 locks the frame in position, as is well known.

*Driving mechanism and continually rotated feed rollers*

By means to be subsequently described a shaft 306 of the basic machine is continually rotated, and said shaft carries a pulley 415 (Fig. 7) having a belt drive connection 416 to a pulley 417 secured to a shaft 418. To said shaft there is secured a gear 419 (Figs. 2 and 4) meshing with a gear 420 secured to a roller drive shaft 421. Drive shaft 421 carries feed rollers 422 (Fig. 4) and is mainly supported by side plates 400, 401, and an extension thereof by a bracket 423 (Figs. 2 and 4) carried by side plate 401. Spring-pressed against these rollers are cooperating rollers 424. The two sets of card ejecting rollers 422–424 (Figs. 4 and 5) are at the bottom of the punching mechanism. Attached to the end of drive shaft 421 adjacent side frame plate 400 (Fig. 4) is a gear 428 driving through an idler gear 428a, a gear 429 secured to a roller drive shaft 430 carrying rollers 431 cooperating with spring-pressed rollers 432. At times rollers 432 are separated from rollers 431 for the purpose of registering a card with the punches in a manner to be explained. The sets of rollers 431—432 are also continually driven and are of the "slip type" and urge a card in the punching mechanism against a card stop or gate 433.

There is also a set of rollers 441—442 disposed above the punching mechanism and are continually rotated as follows: A gear 437 (Fig. 4) secured to drive shaft 421 drives a gear 438 through an intermediate gear 439. Said gear 438 is attached to a roller drive shaft 440 carrying feed rollers 441 against which are spring-pressed cooperating rollers 442.

Gear 438 (Fig. 2) drives through an intermediate idler pinion 447 a gear 446 secured to a roller drive shaft 448. Said drive shaft 448 carries feed rollers 449 (Figs. 3 and 5) against which are spring-pressed cooperating rollers 450. Rollers 449—450 are continually rotated and are of the slip type and urge a card fed from the magazine to a viewing station against a card stop or gate 451 to hold it there while it is being examined by the operator. When gate 451 releases a card in the viewing station rollers 449—450, 441—442 and 431, 432 feed said card to the punching mechanism and against gate 433.

*Card feed clutch*

The card feed clutch connects the operating means for the card pickers and the first set of feed rollers to feed a card from the magazine to the viewing station. It is of the usual electromagnetic type, well known in the art.

Shaft 440 has attached thereto a gear 443 which, through an intermediate idler pinion 444 drives a gear 445. Gear 445 has a sleeve connection to a ratchet wheel 455 loose on stub shaft 456 on which is loosely mounted a disk 457 carrying by a pivot stud 458 (Fig. 2) on said disk 457 a pawl 459. Said pawl is normally held from engaging ratchet wheel 455 by the armature 460 of a card feed clutch magnet 461. When the latter is energized a clutch engagement for a full revolution of disk 457 is effected. Attached to disk 457 is a gear 462 which drives through an idler gear 463 a gear 465, attached to a roller drive shaft 466. Said roller drive shaft carried feed rollers 467 (Fig. 3) against which are pressed feed rollers 468. Rollers 467, 468 are the card magazine feed rollers.

*Card picker*

The card pickers 475 (Fig. 4) are adapted to feed the cards singly from the magazine to the viewing station and are carried by a webbed frame 476, said pickers being slidably mounted in slots 477 formed in the front plate 478 of the card magazine. Pivotally mounted on a stud 479 carried by front plate 478 is a double arm 480 which is bifurcated at its free end to receive a block 481 pivoted on a pin 482 carried by webbed frame 476. The right end (Fig. 3) of said double arm 480 has a link connection 483 to a pivoted follower arm 484 urged by a spring 485 to bear against a profile cam 486 pivoted on a stud shaft 487. Attached to said cam 486 is a gear 488 meshing with an idler gear 489 which in turn meshes with a gear 490 secured to the end of the drive shaft 466. When the aforesaid one-revolution clutch is engaged shaft 466 is driven two revolutions which through the reduction gear drive described rotates cam 486 one revolution to thus reciprocate card pickers 475. The latter move the foremost card to the now rotating feed rollers 467—468 which feed the card to the now rotating feed rollers 449—450. The latter urge the card against the gate 451, holding the card in the viewing station so that written numerical data can be read by the operator.

*Card magazine*

The card magazine (Figs. 2 and 5) is of sufficient capacity to hold about 675 cards of 51-card-column width. The cards are inserted so that they are fed downward with the "9" index point leading to have the written data on the face thereof visible at the viewing station. The edges of the cards are placed to rest upon a base plate which has suitable side plates to provide an open top magazine. A follower plate 491 is urged by means now to be described to automatically move the stack of cards forwardly.

Figure 5:
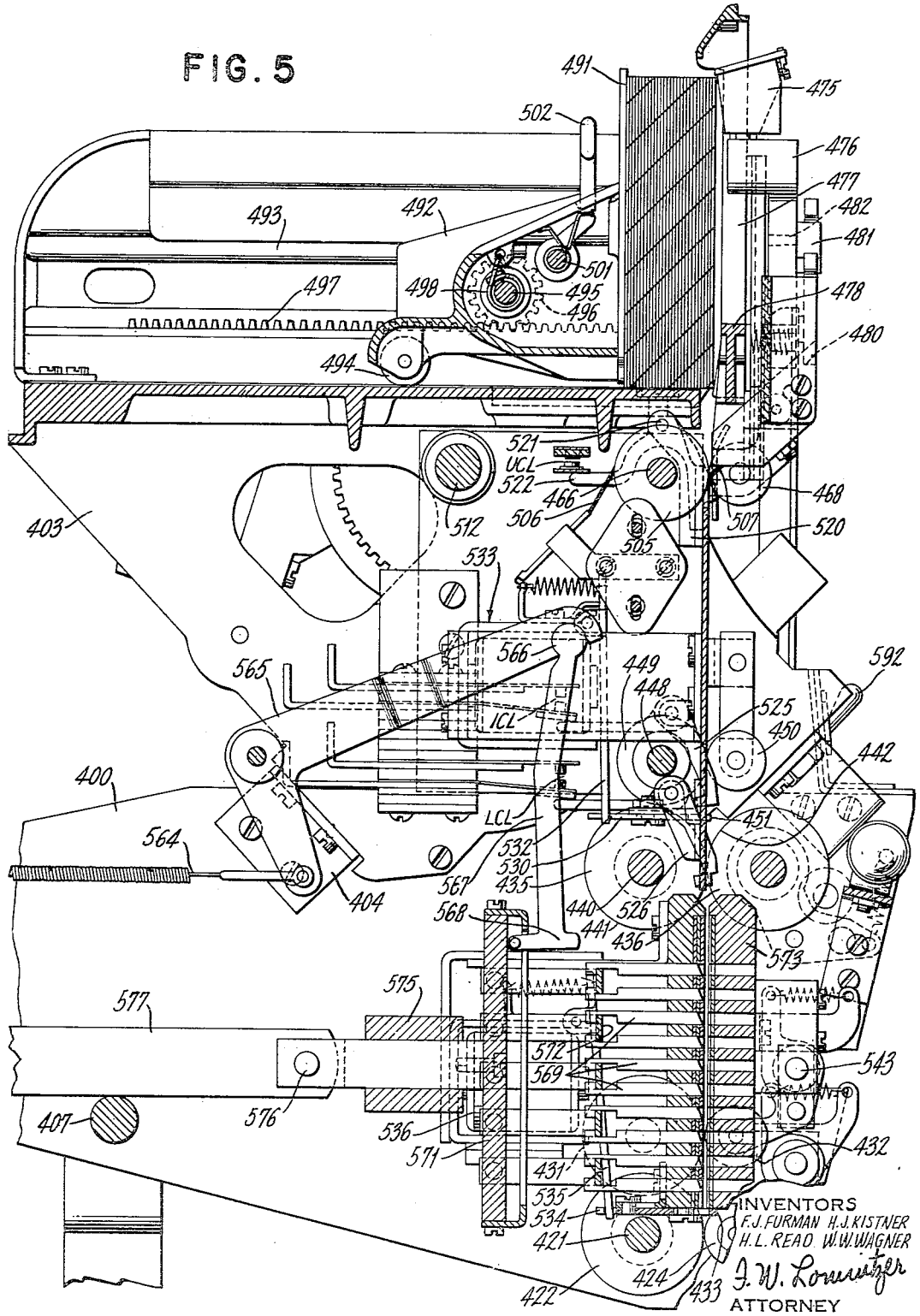
Fig. 5 is an irregular sectional view taken in the line 5—5 of Fig. 4.

A casting 492 is apertured so as to receive a fixed guide rod 493 and said casting also carries rollers 494 traveling over the base plate of the card magazine to enable said casting 492 to be urged to the right and therefore the follower plate 491 affixed to said casting. The casting 492 also carries a shaft 495 having affixed thereto pinions 496 adapted to roll over a related rack 497. A coil spring 498, which is similar to a clock spring, surrounds and is secured at one end to shaft 495 and is wound up as the casting 492 is moved rearwardly, or to the left as shown in Fig. 5. When in such position a spring-pressed latch 499 (Fig. 2) is moved manually to latch over a fixed stud 500, thereby latching the casting 492 and follower plate 491 in the rearmost position while said coil spring 498 is retained wound up. Latch 499 is secured to a shaft 501 to which is fixed a manual lever 502 and when said lever is rocked by the operator it disables latch 499. The latch is disabled after a supply of cards is placed in the magazine by the operator and freeing of the casting 492 and follower plate 491 enables the latter to be moved to the right by action of spring 498, compressing the stack of records and urging the foremost card against the card pickers 475 so that it may be fed singly from the magazine.

*Card analyzing means*

Figure 4:
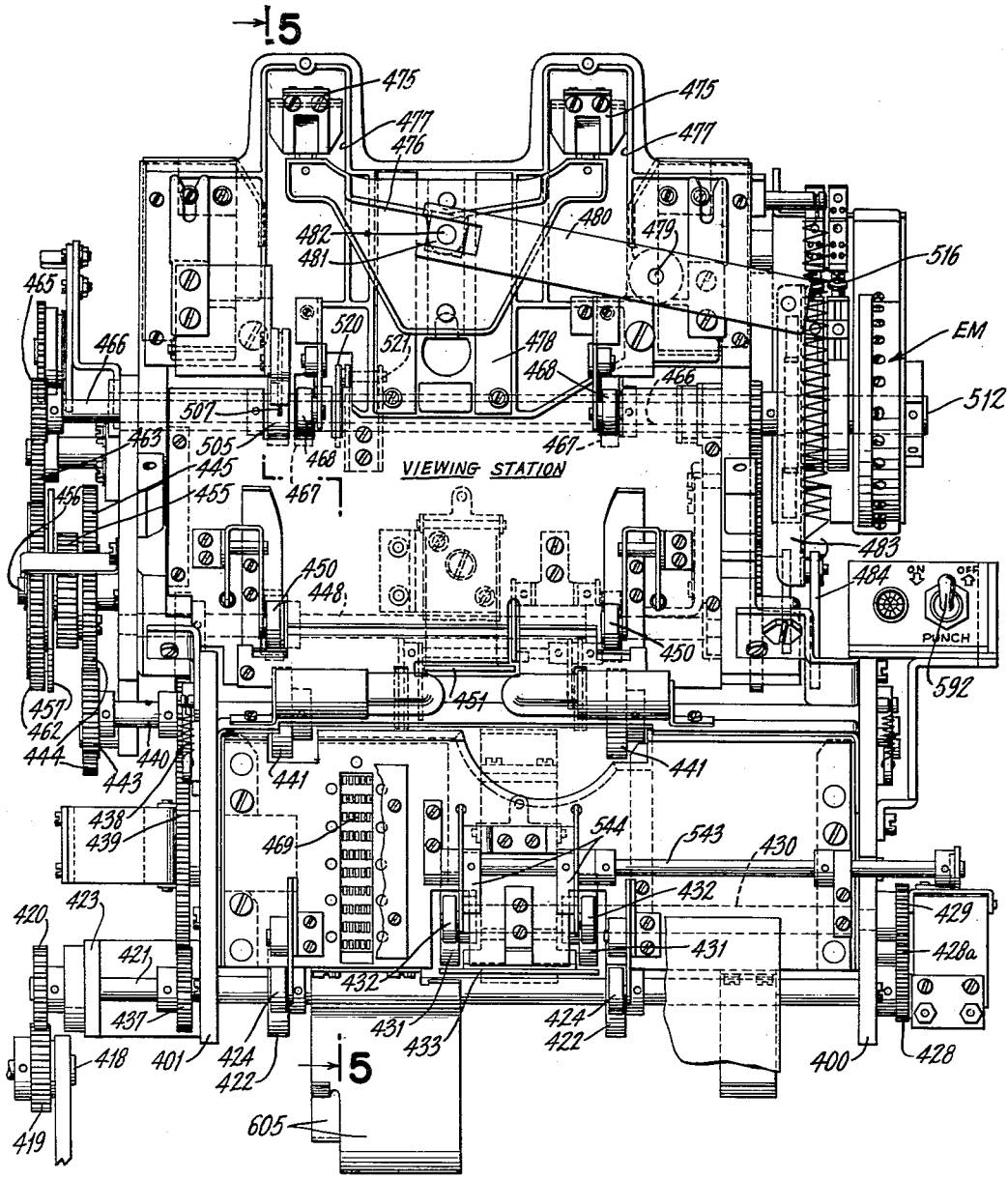
Fig. 4 is a view in front elevation of the card feeding and punching mechanism.

Each card is prepunched in card column 1 (see Fig. 20a) to represent one of twelve Federal Reserve district numbers at index positions 9–1, 0, X and R, and in accordance with the perforation analyzed an appropriate sorting compartment is selected to receive said card, previous to which it is further punched by a punching mechanism under control of a ten-key keyboard mechanism to represent the written amount on the card, as will be described. Referring to Figs. 4 and 5, said shaft 466 carries an insulated disk 505 having an exposed ring against which bears a collector brush 506 and an analyzing brush 507. Said analyzing brush 507 is positioned at column 1 to sense or analyze the Federal Reserve district number representing perforations.

*Circuit breaker emitter and punch contacts*

Figure 3:
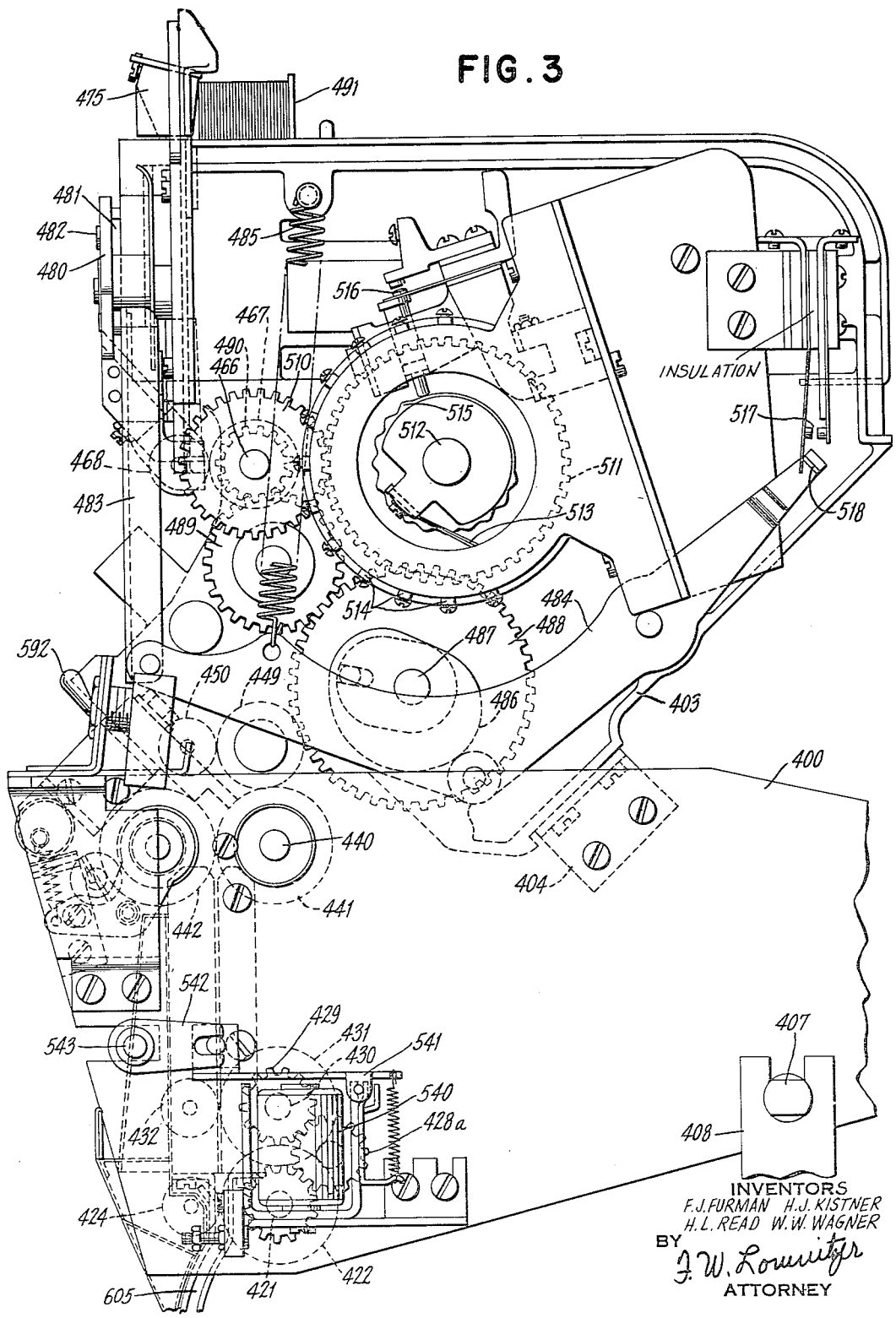
Fig. 3 is a view in side elevation, similar to Fig. 2 but taken at the right side.

Referring to Figs. 3 and 6b, attached to shaft 466 is a pinion 510 meshing with a gear 511 secured to a shaft 512. Attached to shaft 512 are members carrying brushes 513 (Fig. 3), one of which makes contact with a collector ring and the other with contact points 514, thus providing an emitter EM of a well known type. Said brush 513 makes successive contact with the contact points 514 timed with the sensing of the index points in the order 9–1, 0, X and R.

The circuit breaker is of the well known form and comprises dentated cams 515 on shaft 512 adapted to close the related circuit breaker contacts 516. A duplicate arrangement is provided so as to provide make and break contacts as is well known.

The gearing of the machine is so arranged that shaft 512 is driven two revolutions and, therefore, there would be one operation of the emitter and circuit breaker during the first and second parts of each cycle. Since the circuit breaker and emitter are to be used only during the first half of the cycle between 50 and 170° while the card is being sensed they are disconnected from the line side by means of picker knife contacts 517 (Fig. 3). As is shown in Fig. 3 an extension of the follower arm 484 is provided with a lug 518 bearing against one blade of contacts 517. During the clockwise rocking (Figs. 3 and 4) of the follower arm 484 to feed the card downwardly while it is being sensed, lug 518 leaves the blade of contacts 517, enabling them to close and since they are in series with the circuit breaker and emitter, as will be described in connection with the wiring diagram, both are effective during the first half of the cycle. After the sensing of the card and the return of the card pickers the follower arm 484 is in a position determined by cam 486 to again open contacts 517 which are maintained open during the second half of the cycle. Therefore, even though the circuit breaker and emitter operate during the second half of the cycle they are both ineffective.

*Upper card lever UCL, intermediate card lever ICL and lower card lever LCL*

Associated with the card feeding mechanism and card punching mechanism are card levers provided for the purpose of determining that the cards have been properly fed and are in correct position. They are similar in construction and a general description will be given of each together with their individual functions which will be better understood when the wiring diagram is described.

Upper card lever UCL consists of a lever 520 (Fig. 5) pivoted at 521 and connected to said card lever 520 is a contact operating extension 522 which is adapted to close card lever contacts UCL. Closure of this contact establishes a circuit to the sensing brush 507 and the sorting compartment selecting circuits.

The intermediate card lever 525 (Fig. 5) is adapted to close contacts ICL and the card lever is operated by the card when the card is properly disposed in the viewing station. Its primary function is to render the motor release bar circuit effective when the card lever senses the proper disposition of the card in the viewing station.

The lower card lever LCL consists of a duplicate set of card levers 526 which are operated by the card as it is fed into the punching mechanism. The rocking of these card levers 526 (Fig. 5) by the card closes the lower card lever contacts LCL. When the card is properly located in the punching mechanism the controlling edge of the card drops below the card levers 526, causing the contacts LCL to open. Closure of the card lever contacts LCL as the card is fed downwardly into the punching mechanism controls circuits indirectly to enable the two cycles of machine operation and provide associated interlocks for the same. The reopening of the contact at the proper time when the card is in proper registration with respect to the punching mechanism enables a test circuit to be operative to check the proper position of the card.

*Upper and lower card gates*

The upper card gate 451 (Fig. 5) disposed just below the feed rollers 449—450 is part of a slidable plate 530 and is in the path of card feed to stop the card in the viewing station. Plate 530 is connected to an armature 532 of the upper card gate control magnet 533, which is energized at the proper time to shift gate 451 to release the card for feed by rollers 449—450 to the punch station.

The card gate 433 for the card punch holds the card in the punching mechanism against the feeding action of feeding rollers 431—432. It is part of a plate 534 mounted in a manner similar to plate 530 and is retracted by the armature 535 of a lower card gate control magnet 536 to allow feed rollers 431—432 and 422—424 to eject the punched card out of the card punching mechanism.

*Lateral registration of card*

Means is provided to effect a lateral registration of the card while in the punching mechanism and before punching to insure punching of the holes in the proper positions. To enable the operation of such means feed rollers 432 are moved out of cooperation with feed rollers 431. To this end a magnet 540 (Fig. 3) when energized attracts its armature 541 to rock an arm 542 connected thereto. Said arm 542 is connected to a rock shaft 543 carrying two arms 544 (Fig. 4) behind the arms carrying the rollers 432. When shaft 543 is rocked arms 544 rock the arms carrying the rollers 432 and the latter are moved out of engagement with the card, which can now be moved laterally if needed to effect proper registration.

The card registration magnet 550 (Fig. 2) attracts its armature 551 when energized, and said armature has a link connection 552 (Fig. 6b) with an aligning plate 553 pivoted at 554. Said plate is rocked to engage the left edge of the card, and shift it laterally against fixed card stop plates 549 (Fig. 6b). Magnet 550 is retained energized during the card punching operation after which it is deenergized, and magnet 540 is then deenergized to cause feed rollers 432 to move into engagement with the card to eject the punched card.

Referring to Fig. 7 reference numeral 555 designates a link which is designated 837 in Patent No. 2,142,352 and as fully described there it connects a series of printing segments 556 of the same order together. A series of said segments 556 (see also Fig. 20) are moved to digit positions, as will be described, as in the patent to print digits representing amounts entered in the machine by a ten-key keyboard mechanism, to be subsequently described. In the present machine each of five links 555 for the five orders which are to effect amount punching carries a bracket 560 having a pin and slot connection to a respective bell crank 561. The latter has a pin and slot connection 562 to a related arm 563. One arm of the bell crank 563 has a Bowden wire connection 564 to a bell crank 565, the latter having a socket connection 566 (Fig. 5) to a punch interposer 567. In the normal position of segment 556 the parts just described are retained in the position shown in Figs. 5 and 7 by a spring 545 (Fig. 7). The punch interposer head 568 (Fig. 5) is adapted when lowered to abut a selected one of a series of punch pins 569, and each head 568 is actuated by a punch bar 571 to force the selected punch pin 569 into a die hole of a die 573 to thereby punch at index points 0–9, inclusive.

Each pair of punch pins 569 is notched to receive a retract bail 572 which is pivoted to the punch bar and as it is moved to the left positively retracts the punch used to punch a desired hole.

The punch bar 571 is mounted for suitable reciprocation in a guide bar 575 and has a pivot connection 576 to a link 577 which is pivoted to an arm 578 secured to a rod 579 (Fig. 7). To said rod 579 there is secured an arm 580 connected by a link 581 to a follower arm 582 carrying a roller cooperating with a cam 583 secured to a one-revolution drive shaft 300 which is driven through a clutch each time a motor release bar is depressed, as will be explained later on.

Storage of district number designation

Figure 25B:
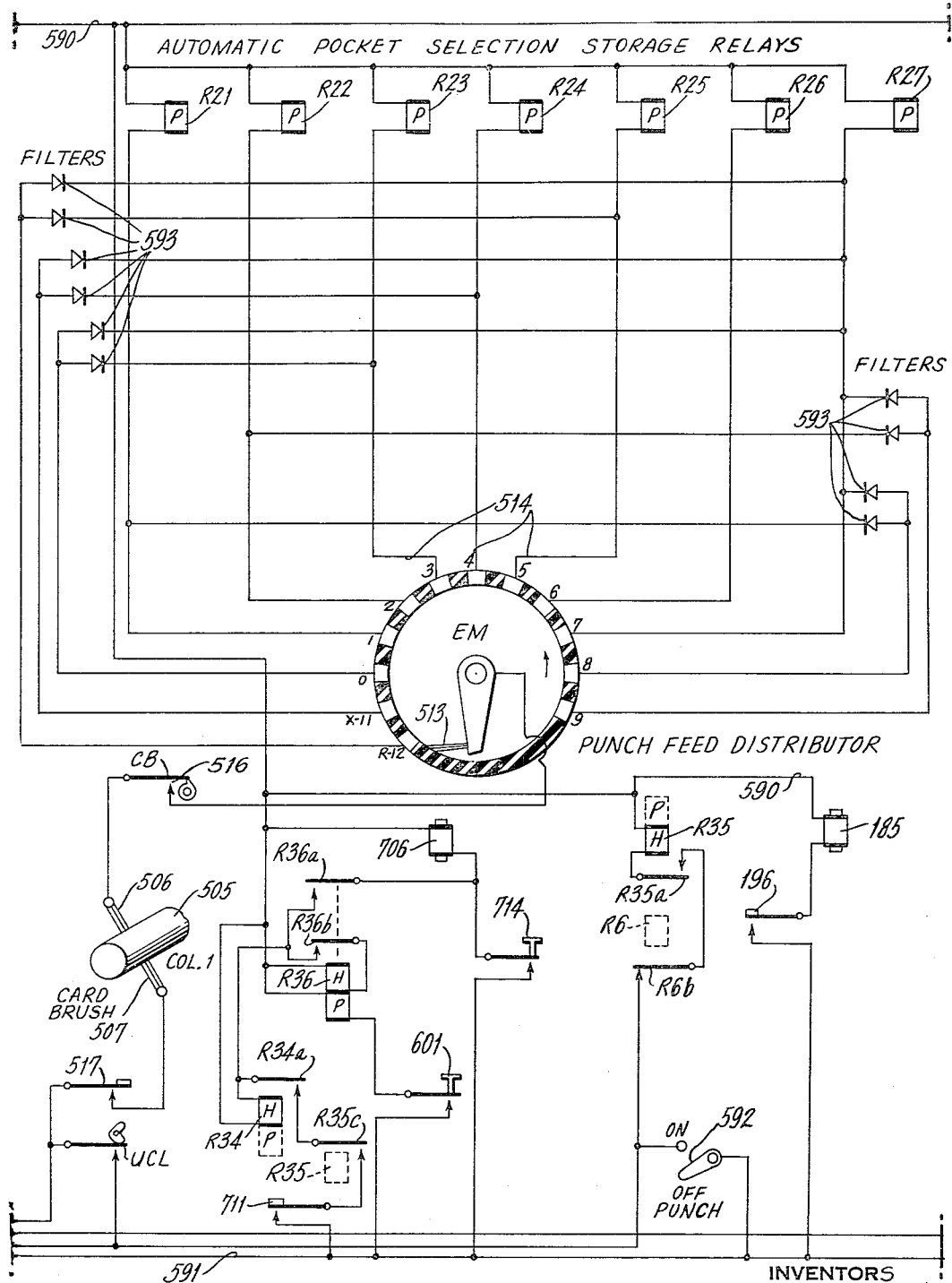
Figure 25C:
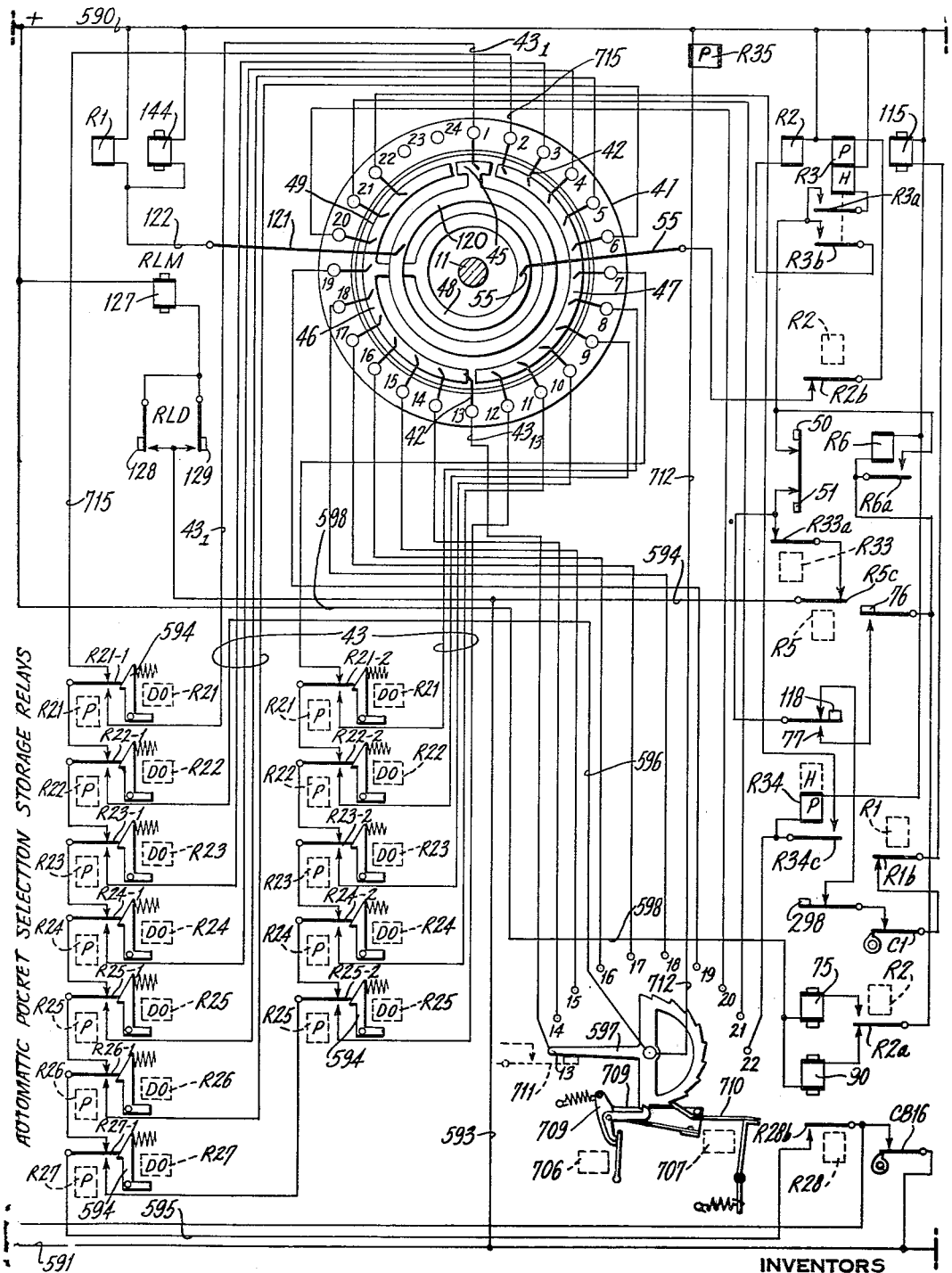

It has been explained that as a perforated card is being fed from the magazine to the viewing station the hole representing the district number is sensed by the analyzing or card brush 507 (Fig. 25b) and a representation of the district number is stored up so that it may subsequently control the selection of an appropriate sorting compartment by a predetermined rotation of the sorting drum. The operation of the storage means will be best understood by reference to the wiring diagram comprising Figs. 25a to 25d. The line sides of the electrical supply are designated by reference characters 590 and 591. When the card is fed from the magazine to the viewing station the card lever 520 is operated at 60° of the cycle (Fig. 24) so as to close the UCL contacts which are retained closed for the rest of the cycle and up to 5° of the next cycle. Closure of UCL contacts will complete a circuit from the line side 591 through a punch switch 592 (Fig. 25b) which is now closed (see also Fig. 4), through UCL contacts now closed, to the R28P relay coil (Fig. 25a) to the line side 590, thereby energizing the R28 relay. A holding circuit for said relay is established when cam contacts CB16 close by a circuit from the line side 591 through CB16 cam contacts, R28a hold contacts to the R28H coil back to line 590. From the timing diagram of Fig. 24, it will be seen that a hold circuit is maintained for the R28 relay from 290° to 5° of the next cycle. In Fig. 25c seven relays designated R21 to R27 are shown, the pickup coils P of which are energized singly or in combination to store up a representation of the district number represented by the sensed hole on the card. The impulse circuit is from the line side 591, switch 592, through UCL contacts (Fig. 25b), the picker knife contacts 517 which are closed during the time that the holes are sensed, thence through the analyzing brush 507, contact roll 505 and collector brush 506, through circuit breaker contacts CB, to the brush 513 of the emitter EM. It will be recalled that the emitter brush rotates synchronously with the sensing of the card holes in the order 9–0, X, R, thereby closing circuits through CB contacts to the R21 to R27P relay coils singly or in combination, as will now be described.

It is in the first part of the cycle that said relays are energized to store up the designation. From various contact points 514 there are individual wire connections directly to certain of the storage relays R21 to R27 and also through filters which comprise selenium rectifiers 593 to pass currents to energize supplemental storage relays but prevent unwanted back circuits to energize unwanted relays. For example, if the 9 hole is sensed an impulse is transmitted from the 9 contact point 514 through one rectifier 593 to the R27 coil to line side 590, and also through a supplemental rectifier 593 to the R22 coil to line side 590, thereby energizing both. If brush 513 makes contact with the 7 contact point 514, the R27 relay coil alone is energized if there is a 7 hole. Thus, in accordance with the hole sensed the storage relays are energized according to the following table:

Table No. 1

| Hole: | Relays energized |
|---|---|
| 9 | R27+22 |
| 8 | R27+21 |
| 7 | R27 |
| 6 | R26 |
| 5 | R25 |
| 4 | R24 |
| 3 | R23 |
| 2 | R22 |
| 1 | R21 |
| 10–0 | 27+23 |
| 11–X | 27+24 |
| 12–R | 27+25 |

The R21P to R27P relays are preferably of the latch type. That is to say, when a P relay coil is energized it will transfer its respective "1" and "2" contacts (Fig. 25c) and associated spring-pressed bell crank latch member 594 will engage the intermediate blade to thereby latch the contacts in transferred position, which determine the sorting compartment to be selected. Associated with each storage relay is a dropout coil designated as, for example, R21DO for the R21P relay coil. When the dropout coil is energized by circuits to be subsequently explained it will rock the associated bell crank latch member 594, thereby unlatching it from the intermediate blade and the contacts will return to normal. Summarizing, as a result of sensing the holes representing the district numbers R21 to R27 relays are energized according to the above code, their contacts transfer and they remain transferred until such time that the contacts are read out so as to determine the particular sorting compartment which is to be selected.

It will be noted from Fig. 24 that the picker knife contacts 517 are closed between 20°–220° and are opened during the second half of the cycle so that even if the circuit breaker CB and emitter EM operate during the second half of the cycle as was described, the opening of said contacts 517 will prevent emission of impulses even in the absence of a card separating brush 507 from the contact roll 505.

The impulse circuit for reading out the 1 and 2 contacts to determine the sorting compartment to be selected is from the line side 591, through cam contacts CB16 (Fig. 25c) which close at about 290° of the cycle in which the designation is stored up, thence through the R28b contacts now closed, to a wire 595. If the R21 relay is energized alone upon sensing a 1 hole its "1" contacts will be transferred so that the impulse from wire 595 will pass through R27-1, R26-1, R25-1, R24-1, R23-1, R22-1, all of which are now normal to R21-1, contacts now transferred, to the wire 43₁. As will be described later on this wire 43₁ will continue a circuit to cause the selection of sorting compartment No. 1. The exit wires 43₁, ₂₋₁₂ which are connected to the normal open side of either "1" or "2" contacts of the R21–R27 relays continue circuits when such contacts are closed to select the compartments corresponding to the subscript upon the transfer of the contacts singly or in combination. However, for the 2 designation (for local items) which causes the energization of the R22 relay alone and the transfer of the R22-1 contacts, the impulse is extended through R22-1 contacts and a wire 596 to a step switch arm 597 of a step-by-step switch distributor. In the position of arm 597 shown in the wiring diagram such impulse would normally select, by wire 43₁₃, the No. 13 sorting compartment but after such compartment is filled a step of movement of the step switch arm 597 will cause the selection of the sorting compartment No. 14, and thereafter if the same filled up condition is found, sorting compartment No. 15 will then be selected for use. Therefore, the "2" district designation will select sorting compartments 13–22 in sequence. The manner in which the various designations select the sorting compartments, in accordance with the district number designations, is represented in the following table:

Table No. 2

| Compartment Number | District No. Designation, Hole or Perforation | Contacts Closed |
|---|---|---|
| 1 | 1 | R21-1. |
| 13–22 | 2 (Local) | R22-1 and rotary switch arm at 13–22 points. |
| 3 | 3 | R23-1. |
| 4 | 4 | R24-1. |
| 5 | 5 | R25-1. |
| 6 | 6 | R26-1. |
| 7 | 7 | R27-1. |
| 8 | 8 | R27-1, R21-2. |
| 9 | 9 | R27-1, R22-2. |
| 10 | 10–0 | R27-1, R23-2. |
| 11 | 11–X | R27-1, R24-2. |
| 12 | 12–R | R27-1, R25-2. |

NOTE.—Nos. 23 and 24 compartments are selected by compartment selector keys in basic machine but unused for present arrangement. Compartment No. 2 is also selected by compartment selector keyboard in basic machine for insertion of mutilated cards therein and as will be described selected automatically when district selection hole is absent or not sensed.

The wires 43, of which there are 20 designated by corresponding subscripts, are individually connected to brushes 42 (Fig. 25c) and the particular brush which is rendered "live" by being connected to the line side 591 will effect, as will be described, the selection of the desired sorting compartment.

In order to understand how this is effected there will now be described the mechanical and electrical construction of the card sorting mechanism.

*Card sorting mechanism*

Figure 1:
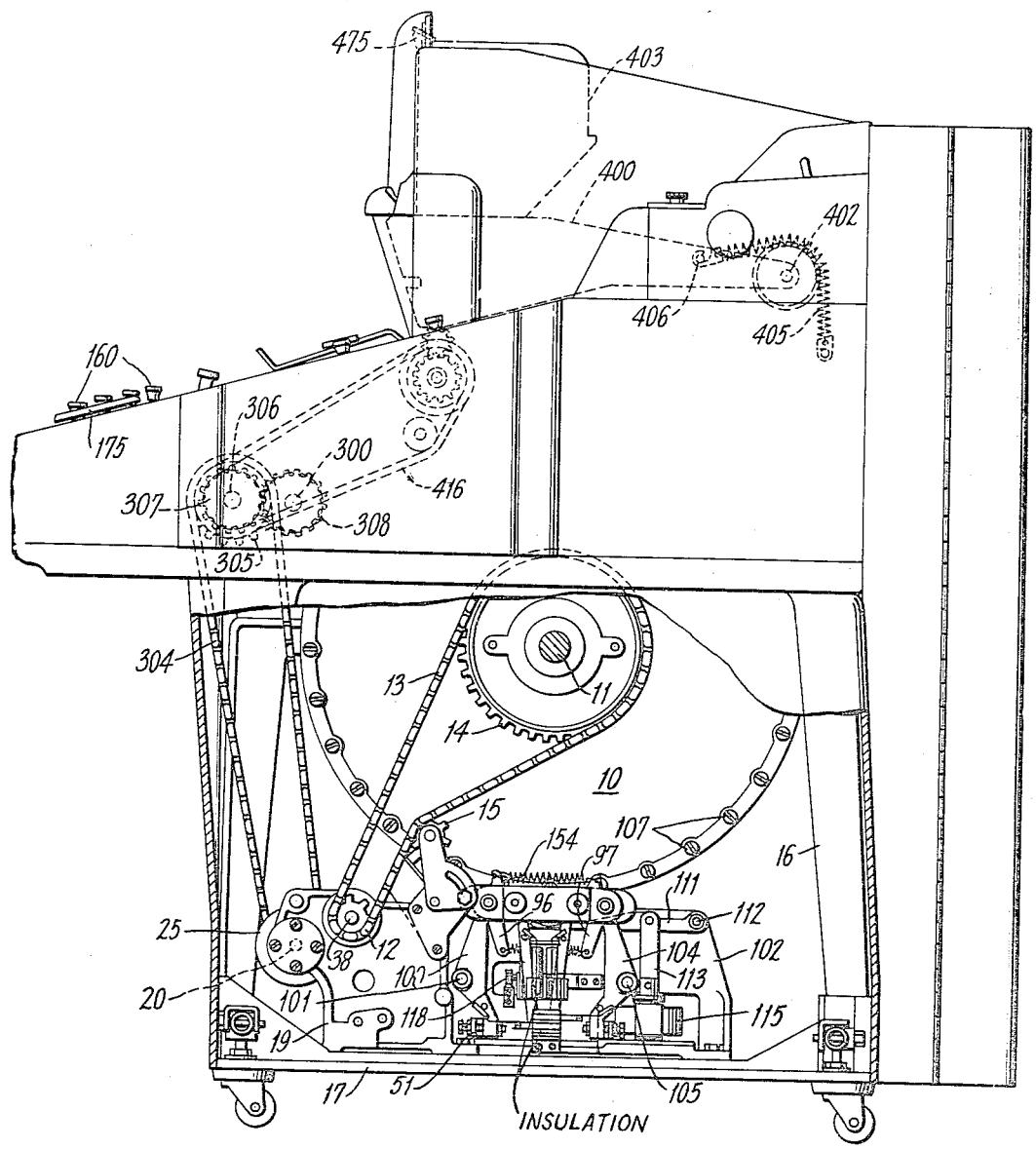

Referring to Fig. 1, the drum 10 is securely mounted on the shaft 11, suitably and rotatably supported in the main framework of the machine. The drum 10 is adapted to be driven by a continuous running motor (not shown) through a two-way clutch which drives a sprocket gear 12 (Figs. 1 and 8) in either direction. A chain 13 passes around sprocket gear 14 secured to the shaft 11. An adjustable idler gear 15 insures the proper tension on the chain 13.

The machine is mounted in a framework indicated generally at 16, and is supported on a base 17. The two-way clutch mechanism is mounted between a pair of brackets 18 and 19 (Fig. 10) secured to the base 17. The motor (not shown) is mounted on the base 17 and drives the clutch mechanism through a shaft 20 mounted in the brackets 18 and 19 and directly connected to the armature shaft of the motor. Secured to shaft 20 midway between the brackets 18 and 19 is a driving clutch member 21, comprising a pair of clutch plates 22 and 23, which rotates continuously with the shaft 20 in the direction indicated by the arrow in Fig. 10. Rotatably mounted on the shaft 20 adjacent the driving clutch members 21 are driven clutch plates 24 and 25, each provided with suitable clutch facing material indicated at 26.

The clutch plate 24 is mounted on a sleeve 27, which sleeve is also integral with a gear 28. The clutch plate 25 is similarly connected by a sleeve 29 to a gear 30 on the shaft 20.

The gear 28 meshes with an intermediate gear 36 (Fig. 8) which meshes with a gear 37 fast on a shaft 38 mounted in the brackets 18 and 19 and on which is secured the sprocket gear 12. The gear 30 meshes with a gear 39 fast on shaft 38.

Obviously, if the clutch plate 24 is brought into operative contact with the driving plate 22 the clutch plate 24 and the gear 28 will be driven in a clockwise direction, and, through the gear 36 will drive the gear 37, shaft 38 and sprocket gear 12 also in a clockwise direction to rotate the drum 10 in the same direction. However, if clutch plate 25 is brought into contact with the driving plate 23 the plate 25 and the gear 30 are rotated clockwise. The gear 30 meshing directly with the gear 39 drives shaft 38 and sprocket gear 12 in a counterclockwise direction to rotate the drum 10 counterclockwise.

The selective movement of clutch plates 24 and 25 to contact with the driving plates 22 and 23 is controlled by the position in which the drum stands and by the particular district number designation stored up. Fixed to the framework of the machine and surrounding the drum shaft 11 is a ring 41 (Fig. 25c) of insulating material upon which is mounted a series of brushes 42 arranged annularly about the ring 41, there being a brush 42 for each sorting compartment.

A commutator comprising conducting segments 45, 46 and 47, and a collector ring 48 shown diagrammatically in Fig. 25c mounted in a disk 49 of insulating material is fixed to the drum shaft 11 adjacent the ring 41. The brushes 42 are carried by the ring 41 and contact with the segments 45, 46, and 47. When the drum 10 is at rest the segment 45 is in contact with the brush 42 associated with the last compartment selected. The segment 46 is electrically connected to the collector ring 48 by a radial strap of conducting material.

Assuming that the sorting drum is now standing at the last selected No. 1 compartment position at which time the "1" brush 42 is in contact with segment 45, as shown in Fig. 25c, and a different compartment is selected, the R1 relay and magnet 144 will not be energized when the machine is cycled and CB16 cam contacts close at 290°. This open circuit is from line side 591, cam contacts CB16, R28b contacts now closed, wire 595, serially through certain contacts which are opened or closed according to the designation storage relays R21—R27 energized or deenergized, to a wire 43 associated with the new compartment to be selected and its connected brush 42, but since it does not now contact segment 45 the circuit which would be completed by brush 121, wire 122 to R1 relay and magnet 144 is open at this point. But when cam contacts C1 close later at about 350° the following circuit is completed. Line side 591, wires 593, 594, R5c contacts now closed, R33a relay contacts now closed, contacts 118 now closed, contacts 298 now closed, C1 cam contacts, R1b relay contacts now closed, magnet 115 to line side 590.

The drum 10 is normally held in position by a pair of stop arms 96 and 97 (Figs. 8 and 11) and is also accurately aligned in position by a slidable lock plate 98 (Figs. 8 and 10). The stop arm 96 is pivotally supported at 99 (Fig. 11) by a pair of arms 100 pivoted on a stud 101 projecting from a frame 102 secured to the base 17. The stop arm 97 is similarly supported at 103 by a pair of arms 104 pivoted on a stud 105 in the frame 102. A spring 106 stretched between projections of the arms 96 and 97 normally holds these arms in their effective or raised positions.

The stop arms 96 and 97 as well as lock plate 98 cooperate with studs 107 secured to the side of the drum 10, there being a stud 107 for each compartment position on the drum. Before the drum can be rotated it is necessary to withdraw the arms 96 and 97 clear of the particular stud 107 between said arms and withdraw lock plate 98 from a stud 107. To this end the stop arms 96 and 97 are provided with hooked projections 108 and 109, respectively. Extending immediately above these projections is a stud 110 carried by the free end of a lever 111 pivoted on a stud 112 (Fig. 8) in the frame 102. A link 113 pivotally connected to the lever 111 has secured to its lower end the armature 114 of a solenoid 115.

Energization of the solenoid 115 attracts its armature 114, drawing the link 113 downwardly and rocking the lever 111 counterclockwise. This movement of the lever 111, through the stud 110, rocks the stop arm 96 clockwise and the stop arm 97 counterclockwise, thus moving said stop arms out of the path of the stud 107 with which it is now engaged.

As the latch arms 96 and 97 approach the lower limit of their movement caused by the energization of solenoid 115, ears 124 formed on the free ends thereof, come below the bent end of a latch arm 125 (see Fig. 9), which arm is immediately rocked counterclockwise (Fig. 9) by a spring 126 to latch the stop arms 96 and 97 down in their ineffective positions.

The arm 125 is pivoted at 139 (Fig. 9) and has a horizontally extending tail 140 (Fig. 8) to which the spring 126 is attached. The tail 140 carries an insulating roller 141 which cooperates with a blade of contacts 118 and 77. As the latch arm 125 rocks counterclockwise to latch the stop arms 96 and 97 down the tail 140 through the roller 141 opens contacts 118 and closes contacts 77. When the contacts 118 are opened the previously described circuit to solenoid 115 (Figs. 8 and 11) is opened and solenoid 115 deenergized, allowing a spring 142 (Fig. 8) to raise the arm 111, link 113 and armature 114 to their upper positions.

Also before the drum 10 is free to rotate the lock plate 98 (Fig. 10) must also be removed to ineffective position. The notch 98a of this plate as shown in Fig. 8 normally engages one of the studs 107. The lock plate 98 is attached to the armature of a solenoid 127 and is withdrawn by solenoid 127 (Figs. 8 and 10) when it is energized under control of contacts 128 and 129 (Fig. 8) closed by the stop arms 96 and 97 when they are withdrawn to free the drum for rotation. Mounted near the stop arms 96 and 97 are the pair of contacts 128 and 129 electrically connected in parallel (see Fig. 25c) and having their inner blades bent outwardly at an angle (see Fig. 8). These angular ends of the inner blades carry blocks 130 of insulating material (Fig. 10). Studs 136 and 137 (Fig. 10) projecting respectively from the links 96a and 97a (Fig. 11) pivoted to respective stop arms 96 and 97 cooperate with the blocks 130 (see also Fig. 8) to hold the pairs of contacts 128 and 129 open when the stop arms are in their effective positions. When the stop arms 96 and 97 are pulled down to unlock the drum 10 the studs 136 and 137 are carried out of contact with the blocks 130, whereupon the contacts 128 and 129 are closed by the spring tension of the blades.

Closure of contacts 128 or 129 (see Fig. 25c) completes a circuit from line side 591, wire 593, wire 598, contacts 128, 129, solenoid 127 to line side 590, which attracts its core 138 (Fig. 8) and shifts the lock plate 98 clear of the stud 107.

Lock plate 98 has a stud 95 (Fig. 10) which rocks a bell crank 94 to close contacts 76 and open contacts 143 when the lock plate 98 is rocked clear of the stud 107. The drum is now free to rotate and the selected clutch magnet 75 or 90 is energized by the following described circuit to drive the drum to its newly selected position.

If, for example, the "13" compartment is to be selected, the wire 43$_{13}$ would extend the circuit to No. 13 brush 42, to complete a circuit from such brush, segment 46, ring 48, a brush 55, R2b interlock contacts now closed, the R3 or reel reverse control relay, to line side 590. A holding circuit for R3H coil is through the R3a contacts, reel stop timing contacts 50 and 51, R33a and R5c relay contacts, wires 594, 593 to line side 591. R3b contacts close to pick up the R2 reel reverse control relay by a circuit from line side 590, R2 relay, R3b contacts, contacts 50, contacts 51, R33a and R5c relay contacts, wires 594, 593 to line side 591. Energization of R2 relay now transfers its R2a contacts, completing a circuit when contacts 76 are closed, from line side 590, wire 598, clutch control magnet 75, R2a relay contacts now transferred, contacts 76 now closed, contacts 77, relay contacts R33a and R5c, wires 594, 593 to line side 591. This energizes clutch control magnet 75. Closure of contacts 76 also completes a circuit to the R6 relay.

Referring now to Fig. 10, when the clutch control magnet 75 is energized it attracts its armature 78 which is carried on the end of a lever 79 pivoted at 80 on a bracket 81 mounted between the brackets 18 and 19. This rocks the lever 79 clockwise (Fig. 10).

Pivotally carried by the lever 79, at the end opposite the armature 78, is a pair of yokes 82 and 83. These yokes carry rollers 84 and 85 projecting into annular grooves 86 and 87 in the sleeves 29 and 27, respectively. At their opposite ends the yokes 82 and 83 carry adjusting studs 88 and 89 bearing against the bracket 81.

When the lever 79 is rocked clockwise under the influence of clutch control magnet 75, it rocks the yoke 82 also clockwise, bringing the clutch plate 25 into contact with the driving member 23, whereupon the gear 30 is driven clockwise (Fig. 8) rotating gear 39 and sprocket gear 12 counterclockwise to rotate the drum 10 in the same direction until the segment 45 contacts the No. 13 brush 42. The drum is stopped in this position by mechanism later to be described.

Assuming now that the "12" designation is sensed with the No. 1 compartment previously selected and the drum 10 standing in the "1" position, the drum will rotate in the opposite or clockwise direction to bring the "12" compartment into registry with the check feeding aperture.

Referring to Fig. 25c it may be seen that the No. 12 brush 42 is in contact with the segment 47. This segment 47, having no connection to the ring 48, is ineffective to energize the R3 relay, or the R2 relay. Therefore, upon closure of contacts 76 a circuit is established from the line side 590, a second clutch control magnet 90, R2a contacts now normal, contacts 76 now closed, contacts 77 now closed, R33a relay contacts now closed, R5c relay contacts now closed, to line 591. Closure of contacts 76 also completes a circuit to the R6 relay.

Energization of magnet 90 rocks the arm 79 (Fig. 10) counterclockwise, engaging the clutch plate 24 with the driven plate 22, which, through the gears 28, 36 and 37, rotates the sprocket gear 12 and the drum 10 clockwise until the segment 45 contacts the "12" brush 42.

When magnet 90 is energized the R6 relay is energized, and when magnet 75 is energized R6 relay is also energized. R6 relay and selected clutch magnet 75 or 90 are held energized through R6a contacts and contacts 50, 51 until the latter open when a selected compartment arrives at the proper position; R6 relay keeps the selected clutch magnet 75 or 90 energized after contacts 76 open and until the contacts 50, 51 are opened in a manner now to be explained.

Each of the arms 100 and 104 has a respective depending projection 100a and 104a (Fig. 8). As will be explained when the stud 107 strikes the stop arm 97 the latter is moved to the right and rocks arms 104 clockwise and the arm 104a also clockwise to allow contacts 50 to open. When the stud 107 strikes the stop arm 96 it rocks arms 100 counterclockwise and the arm 100a in the same direction to allow contacts 51 to open. Thus, in either direction of rotation of the drum 10 contacts 50, 51 are opened at the proper time to deenergize the R6 relay and the selected clutch magnet 75 or 90, even after contacts 76 have been opened. This insures a power drive of the drum to the newly selected position.

The drum continues to rotate after a run-in cycle, or at the end of the second of the two cycles of machine operation until it arrives at the position where the selected compartment determined by the card last sensed comes opposite the card receiving aperture, whereupon the rotation of said drum is arrested and the drum is accurately aligned in position by mechanism now to be described. During the rotation of the drum the ten-key keyboard is operated.

It will be remembered that the commutator comprising the segments 45, 46, 47 and rings 48 and 120 (Fig. 25c) rotates with the drum 10, whereas the disk 41 together with the brushes 42, 55 and 121 remain stationary. As soon as the segment 45 contacts the brush 42 corresponding to the compartment selected and just before the drum is at its newly selected position a circuit is established by the effective wire 43, the related brush 42, segment 45, ring 120, brush 121, wire 122, magnet 144 and shunted R1 relay to line 590. Energization of magnet 144 (see Fig. 9) attracts its armature 145, which is secured to the latch arm 125, rocking the latter clockwise (Fig. 9) to free the stop arms 96 and 97, and also open contacts 77 and close contacts 118 to deenergize magnet 115. Contacts 77 open to assure no hold circuit to R6 relay and clutch magnets 75 or 90 when contacts 50, 51 open. Since a change in the position of the sorting drum requires energization of magnet 115 through contacts 118, the latter are now closed. The spring 106 (Figs. 8 and 11) immediately throws the stop arms upwardly to effective drum locking position. When the stop arms move upwardly and the drum comes to a complete rest, contacts 128 and 129 open to deenergize magnet 127 which allows lock plate 98 to engage a stud 107 and at the same time open contacts 76 and close contacts 143. Although contacts 76 open, the selected clutch magnet 75 or 90 is held energized until contacts 50, 51 open. If the drum 10 is rotating in a clockwise direction the stud 107 wipes over stop arm 97 and strikes arm 96. If rotating counterclockwise the stud 107 wipes over arm 96 and strikes stop arm 97. It will be recalled that this results in opening either contacts 50 or 51.

A slide 146 (Fig. 10) is pivoted at its left-hand end on the stud 99 on which the stop arm 96 is pivoted. The slide 146 is slotted at 153 to surround and slide over the stud 103 so that as the stud 99 moves to the left the slide 146 moves in the same direction. Similarly a slide 147 has one of its ends pivoted on the stud 103 on which is is pivoted the stop arm 97. The slide 147 is slotted at 148 (Fig. 8) to slide over the stud 99 so that as the stud 103 moves to the right the slide 147 moves in the same direction. Between he slides 146 and 147 is fixedly mounted a friction plate 149 (Fig. 10) of suitable friction producing material. The slides 146 and 147 are pressed against friction plate 149 by springs 150 surrounding studs 151 carried by the slide 146 and projecting through suitable slots in slide 147. The studs 151 pass through holes in the friction plate 149 to hold it in position between plates 146 and 147. Between ears 155 of plates 146 and 147 a spring 154 is stretched (Fig. 10). Between the studs 99 and 103 is stretched a spring 153a (Fig. 10).

Assuming, for example, that the drum 10 is rotating counterclockwise, the stud 107 strikes the stop arm 97 (Fig. 8), and moves the slide 147 to the right. The shock of the blow is absorbed by the friction between the slide 147 and friction plate 149 and by the extension of spring 154, which spring reacts to bring the stud 107 and the drum to the position wherein the selected compartment is in registry with the card receiving chute. When the stud 107 again strikes the stop arm 97 it stretches spring 154 (Figs. 8 and 10) and stud 107 then rebounds against arm 96 and when stud 107 strikes the stop arm 97 the action just described occurs but to a lesser degree. This rebound or "chatter" would be quite extensive if only the spring 154 was depended upon to bring the drum to rest. The friction member 149 is provided to dampen the rebound action effected by the spring 154.

When the inertia of the drum has been overcome by the brake friction plates and spring 154, both arms 96 and 97 will be up, allowing both contacts 128 and 129 to open to deenergize magnet 127 which allows lock plate 98 to engage a stud 107.

It is necessary that the lock plate 98 (Fig. 8) be maintained in its ineffective position until the drum 10 has come to a complete rest. This is effected by maintaining one or the other of the contacts 128 and 129 closed until the drum is completely stopped. This maintains the magnet 127 (Fig. 8) energized to hold the lock plate 98 in its disengaged position. When the stud 107 strikes the stop arm 97 this arm, as stated above, is moved to the right (Figs. 8 and 10), carrying the stud 137 therewith away from the insulating block 130. This permits contacts 129 to remain closed. When the spring 154 rebounds, carrying the drum 10 and stud 107 back past center, said stud 107 strikes the stop arm 96 moving it slightly leftward, at which time the stud 136 is carried away from the insulating block 130. This permits contacts 128 to close. Thus, if the stud 107 is off center in either direction one or the other of the contacts 128 and 129 is closed. As soon as the drum comes to a complete rest, both contacts 128 and 129 are opened, deenergizing the magnet 127, whereupon the lock plate 98 is shifted by a spring 156 (Fig. 10) to accurately align the drum.

*Ten-key controlled amount setup mechanism*

The ten-key keyboard mechanism is provided for setting up amounts read by the operator on the postal money order cards to be punched before they are sorted. Any suitable ten-key keyboard mechanism may be used and one type that may be used is fully shown in the application of F. J. Furman et al. Serial No. 217,118, filed March 23, 1951, and only that much of its construction and operation that is necessary to understand the present invention will be explained.

During the rotation of the sorting drum to select a compartment in accordance with the district number designation of the preceding card and prior to the depression of the motor release bar 175 the amount read on said preceding postal money order card is set up by the ten-key keyboard, the purpose of the associated setup mechanism being to cause the punching mechanism to be set in the next cycle initiated by the motor release bar to punch on the card the holes representing an amount corresponding to the amount on the postal money order card.

The ten-key keyboard unit has ten numeral keys 160 (Fig. 13) which are arranged in a conventional ten-key keyboard arrangement and upon the upper protruding ends of the slidable key stems 161 there are mounted the key caps which designate the digital value of each key. The key stems slide in a slotted guide plate 162 and at their lower ends they are each articulated by a pin 163 to a hook operating arm 164, all ten of which are pivoted on a rod 165, each arm 164 being urged by an associated spring 166 against a stop bar 167, said spring 166 also normally functioning to return each key after it has been depressed, as well as to return the associated arm 164 against the stop bar 167. Each arm 164 carries a stud 168 projecting against a finger 169 of an associated arm 170 having a hooked end 171. Each arm 170 is pivotally mounted by a stud 172 to the associated stop pin raising arm 173. Each arm 173 is urged by a spring 174 to normal position, shown in Fig. 13 and all of said arms 173, of which there are ten, one for each key 160, are pivoted on a rod 178. It will also be seen that a spring 179 connected between a hole in the pin raising arm 173 and related arm 170 retains the finger extension 169 against the stud 168, as is shown in Fig. 13.

So far it is evident that when a key 160 is depressed by the finger of the operator it will rock hook operating arm 164 counterclockwise against the action of the spring 166, causing stud 168 to act against the finger 169 to rock the arm 170 slightly counterclockwise to bring the hook end 171 underneath a power-operated bail 180. It is evident, therefore, that the only load upon the operator in depressing a key is that required to rock the arm 170 so as to place the hook-shaped end 171 beneath the bail 180, the power required to do so being very slight due to the weak springs 179 and 166. After the hook-shaped end 171 is caught underneath the bail 180 there is a power operation of the bail 180 by electrical power means initiated in operation by the following described mechanism. Bail 180 is secured to a rock shaft 181 and secured to said shaft 181 there is an arm 182 which is articulated by a stud 183 to the core 184 of a power solenoid 185. The bail 180 is normally held in the position shown in Fig. 13 by means of a spring 186 connected to said arm 182.

Extending beneath each of the key stems 161, which are of such shape that they are in a single line at their lower extremities, is a bail 190 which is pivoted upon a rod 191. One arm of said bail 190 is connected by a stud 192 to a contact operating member 193 which is urged by a spring 194 so that its left-hand extension fits in slots 195 of the blades of contacts 196. The spring 194 also retains contact operating member 193 so that its shoulder 197 is immediately adjacent the left-hand contact blade.

When said bail 190 is rocked counterclockwise it will, through its pivot stud 192 move contact operating member 193 slightly to the right, as viewed in Fig. 13 so that shoulder 197 bearing against said left-hand contact blade will close contacts 196. It should be noted that closure of contacts 196 is timed to take place after the hook-shaped end 171 of the arm 170 associated with the depressed key is beneath the bail 180 and also that the additional load placed upon the finger of the operator to close such contacts 196 is not great because of the weak spring 194 and the slight power required to close the contacts 196.

Thereafter, a circuit is completed from line side 590 (Fig. 25b), through solenoid 185, contacts 196, line side 591, to energize said solenoid 185 which thereupon attracts its core 184 (Fig. 13), rocking the bail 180 clockwise and through the hooked arm 170 connecting it with the bail 180 rocking the associated pin setup or raising arm 173 counterclockwise against the action of spring 174 to set up, in a manner to be described, a pin in a pin setup carriage representing the digit of the key depressed. This operation takes place without effecting any further movement of the key since, at this time, the finger extension 169 will merely ride down against the stud 168 without effecting any movement of the rocked arm 164 or the interconnected key stem 161.

Near the end of the solenoid plunger power stroke a stud 205 on an arm of the bail 180 operates against the upper edge of the contact closing member 193, rocking the latter slightly counterclockwise and disengaging shoulder 197 from the left-hand contact blade of contacts 196 so that by their inherent resiliency said contacts 196 again open and deenergize the solenoid 185. The depressed key must be returned to nearly its normal position before spring 194 will rock member 193 so as to re-engage the contacts 196 for another closure thereof. Also, the hooked arm 170 is not disengaged from the bail 180 until near the end of the return stroke of the solenoid core 184. Therefore, the depressed key must be returned nearly home before another key can be depressed, or a redepression of the same key can be effected. At this point the rocked arm 164 is released from the single key interlocking mechanism to be presently described so that another key can be depressed.

This single key interlocking mechanism is of a well known construction and comprises a series of disks 206 (see Fig. 15) which have a normal separation which allows the entrance of only one arm 164 between associated disks 206, thus crowding the remaining disks 206 so that no other key stem 164 can be interposed between and thus no other arm can be depressed. When a key is returned home the arm 164 moves away from adjacent disks 206, allowing this normal separation to enable the depression of another key and associated arm 164 between them. Because such form of interlocking mechanism is well known it is only briefly described herein.

In the differential mechanism the setup pins or stops 210 are arranged in a transverse series as shown in Fig. 13 in which all pins in each transverse series represent the same digit and in which the pins or stops are also arranged in longitudinal series (Fig. 14) in numerical order 0–8 and all the pins are capable of being selectively set to limit the movements of actuating devices.

The pin setup carriage which is designated generally by the reference character 211 (Fig. 14) includes a U-shaped plate 212 carrying rollers 213 which are slidably mounted in tracks 214 (Fig. 13) each formed by a shoulder in castings 215 (Fig. 14) and a cap plate 216 secured thereto. By this means the pin setup carriage is moved step by step as the longitudinal series of stop pins 210 are successively set up to represent the digits of the keys depressed. The carriage is urged to the left as shown in Fig. 13 by means of a spring 217 connected to the carriage, the step-by-step movement being under control of an escapement mechanism to be subsequently described. The several series of longitudinal stop pins 210, of which there are nine longitudinal series for setting up a number having nine denominational orders, are slidably mounted in a bottom guide plate 220 and upper guide plates 221, both of said guide plates 220 and 221 being carried by and mounted within the U-shaped plate 212. As best shown in Figs. 13 and 14 the pin raising levers 173 for keys 0–8 have nine fingers or extensions 218 which project through said pin setup carriage as shown in Fig. 13 so as to raise an associated stop pin 210 corresponding to the digit key 0–8 depressed of the effective longitudinal series. For each longitudinal series of pins 210 there is a spring-urged detent plate 222 carrying pins 223 which engage one or the other of a pair of notches in each stop pin 210 to hold the pins 210 down in normal position, or one in elevated position, as is well known in such detent mechanism.

Secured to the U-shaped frame plate 212 and carried thereby in any suitable manner are two upstanding side plates 225 and 226 (Fig. 13). To side plates 225 and 226 are attached the guide plates 220 and 221, as seen in Fig. 13. Thus, an extension of the pin carriage is provided and the upper portion of said carriage has cross connecting members, such as guide bars 227 and 228 on which certain members are slidably mounted, as well as supporting shafts 229 and 230 and cross bars 231 and 232 (see Fig. 14). These cross members provide a rigid frame which is an extension and part of the movable pin carriage.

Pivotally mounted on a rod 235 also carried by side frame members 225, 226 is a series of spring-urged latch members 236, each having a hook normally engaging a shoulder 237 of a series of setup slides or racks 238 slidably mounted in the pin setup carriage by the guide rods 227 and 228. A spring 239 attached to each rack 238 urges the latter to the right to cause the hook of the latch member 236 to normally engage the shoulder 237 of the associated slide 238. Each latch member 236 has an extension 240 adapted as the step of movement of the pin carriage moves the effective longitudinal series of stop pins out of engagement with the extensions 218 after a stop pin in said series has been set up, to engage the cam edge 241 of a stationary cam plate 242 (see also Fig. 12).

As viewed in Fig. 12, if the first or left-hand longitudinal series of pins has been set up to represent the digit of the depressed key a step of movement of the pin carriage will cause the extension 240 of the latch 236 of the associated series to engage the cam edge 241 which cam edge will cause the rocking of the latch member 236 clockwise (Fig. 14) to disengage it from the setup slide 238. The spring 239 attached to said slide 238 will now move it to the right until a depending extension 243 thereof strikes the elevated pin stop 210, as is shown in Fig. 14 for the pin 210 elevated by the 3-digit key. It is, of course, understood that the release of the slide 238 occurs after the pin 210 has been raised and held elevated by the detent plate 222. Each slide 238 has rack teeth which mesh with a gear 244 having on the periphery numeral indicia which are visible through a slot in the cabinet so that the numerical value of the previously pressed key is exhibited. As the carriage moves step by step the indicia are brought into view, to represent a number which has been set up.

The escapement mechanism is provided for obtaining the step by step movement of the pin carriage to the left, as viewed in Figs. 12 and 17, as the several longitudinal series of pins 210 are set up by the successive depression of the keys. Underlying the ten pin raising arms 173 for keys 0–9 is a bail 250 secured to the rock shaft 178, said bail 250 having, as shown in Figs. 12 and 17, depending arms 251 and 252, said arm 252 having connected thereto a spring 253 which is adapted to return the bail to normal position after having been rocked by the arms 173. Arm 252 moves back and forth between a pair of adjustable stops 254 (Fig. 17) which limit the extent of rocking of the shaft 178 to which said bail 250 is secured and also an escapement operating arm 255. Secured to the shaft 178, as best shown in Fig. 17, is the escapement operating arm 255. Mounted on a fixed bracket 256 by a stud 257 on said bracket is an escapement dog 258 which is urged by its spring 259 so that a stud 260 carried thereby normally abuts a finger 261 of the escapement operating arm 255. The locking dog 262 is also pivoted on the stud 257 and rocked by a spring similar to spring 259 so that its tail 263 overlies a lug 264 offset from the escapement operating arm 255. An escapement rack 265 is carried by the side plates 225 and 226, said rack having escapement teeth 266 and the escapement rack 265 is of sufficient thickness so that the teeth 266 cooperate with both the locking dog 262 and the escapement dog 258.

When the pin setup carriage is at its normal position having previously been returned to such position, the locking dog 262 engages the extreme left-hand tooth of the escapement rack 265, as shown in Fig. 17, to hold the pin carriage at normal. When bail 250 is rocked downwardly through the first power operation of the selected pin raising arm 173 shaft 178 will be rocked counterclockwise and rock the escapement operating arm 255 in the same direction and by the offset lug 264 in cooperation with the tail extension 263 of the locking dog 262 the latter will be rocked clockwise against the action of its spring. In the meantime, however, spring 259 causes the stud 260 to follow the finger 261, allowing escapement dog 258 to be rocked upwardly as the locking dog 262 moves out of engagement with said first tooth, the pin carriage is now moved by its spring 217 (Fig. 13) a slight amount but not a full step of movement. When bail 250 is returned by its spring 253 escapement operating arm 255 will now be rocked clockwise and finger 261 acting on pin 260 will rock escapement dog 258 out of engagement with said first tooth. In the meantime, however, locking dog 262, is rocked upwardly to cause an ultimate engagement with the second tooth and when the escapement dog 258 fully clears said first tooth the spring 217 which moves the pin setup carriage will move it the remainder of the distance determined by engagement of locking dog 262 with the second tooth to thereby complete the first step of movement of the pin carriage. This form of an escapement mechanism is well known and its operation is only described herein, it being noted, however, that the escapement operation is not performed by the power applied to the keys but is operated by power derived from the solenoid 185 which, it will be recalled, is the instrumentality for rocking the selected pin raising arms 173 and bail 250. Hence, the customary power required by the keys in the previous pin mechanisms for operating the escapement is avoided, and by causing the power operation of the escapement mechanism the load upon the fingers of the operator is further lessened, which aids in a lightened key load and faster key operations.

It is also explained that the 9 key does not cause the setting up of any of the stop pins 210 because there is no pin raising extension 218 for the 9 key and no stop pin 210. Only the digit keys 0–8 inclusive raise stop pins 210. The arm 173 related to the 9 key, however, does operate the bail 250 to operate the escapement mechanism, allowing, as will be presently described, for a 9-digit setup a step of movement of the pin setup carriage.

Referring to Fig. 14 it will be recalled that upon setting up any of the stop pins 210 for the digits 0–8 setup slides 238 take a commensurate movement so as to cause square studs 270 carried at their rearward extremities to be displaced a differential extent rearwardly from hook portions 271 of now stationary actuating control slides 272. As the carriage moves step by step the setup slides 238 are also moved step by step so as to move one or more slides 238 to cause their studs 270 to move in the plane of the hook portions 271 of the control slides 272, said control slides 272 being, in the meantime during the keyboard operation, elevated as shown in Fig. 14 so as to allow this operative relationship to take place without interference.

It will be observed that whenever a 9 key is operated, although no stop pin 210 is set up, the latch member 236 associated with the longitudinal series of pins 210 now effective is, nevertheless, rocked to unlatch the associated setup slide 238 which will be moved by its spring 239 until its extension 243 strikes a rod 275. This rod is stationary during the operation of the keys and will allow the positioning of the stop stud 270 rearwardly so that a certain number of steps of movement may be given to the control slide 272 during the subsequent cycle of operation of the machine to set the punching mechanism to punch the digit 9.

After the setup slides 238 have controlled the differential movement of control slides 272 during the cycle operation of the machine in a manner to be presently explained, the latched pins 210 which have functioned as stops for setup slides 238 are depressed to normal position by the aforementioned rod 275. The pin carriage is being restored at the same time as will be described later.

The rod 275 passes through side frames 225 and 226 (see Fig. 13) and carries rollers at its extremities which roll in guide slots formed in castings 276. The rod 275 is connected by a pair of links 277 and 278 (Figs. 13 and 14) to respective rock arms 280 (Fig. 14) and 279 (Fig. 18), both being pivoted on a rod 281. The arm 279 (Fig. 18) has connected thereto a plate 282 having a bayonet slot 283, the vertical slot of which in the normal position of plate 282 engages a roller 284 of a follower arm 285 cooperating with a profile cam 286 connected to the main drive shaft 300. When said shaft is turned one revolution in a counterclockwise direction during the cyclic operation of the machine, effected by depression of a motor release bar 175 (Figs. 1 and 19), as will be presently described, the cam 286 will, through the linkage just described during the last portion of the cycle, cause rod 275 to be moved to the left to engage the upper bevel portions of the raised pins 210, thus depressing them to normal position and also thereafter engaging the shoulders 243 of each of the unlatched setup slides 238. The latter are moved back by the rod 275 to normal position where they are relatched by the latch members 236.

For returning the pin setup carriage to home position where it is held in such position by the escapement mechanism, one arm 280 carries a stud 290 (Fig. 18) which engages an upward extension 291 of a bell crank 292 (Fig. 13) pivoted on a stud 293. The arm 294 (Fig. 18) of said bell crank engages a pin 295 carried by the U-shaped plate 212 and as the bell crank is rocked the pin carriage will be returned to normal at the end of the cycle and held at such normal position as shown in Fig. 12 by the locking dog 262, it being noted that during such return locking dog 262 merely ratchets over the teeth of the escapement rack 265. During the return of the carriage the carriage return spring 217 (Fig. 13) will also be retensioned as is evident.

*Means for locking ten-key keyboard under certain conditions*

It is desirable to prevent operation of the ten-key keyboard when certain full compartment conditions exist.

It was explained that when any arm 164 is operated by a ten-key 160 it passes between a series of disks 206 to lock out the other keys (see Fig. 15). Referring now to Fig. 16 it will be observed that when a magnet 1390 is energized it attracts its armature 1381 to project an extension 1382 which is the width of an arm 164 in between said disks 206 to lock the ten keys. The particular full compartment conditions under which the keys are locked by this mechanism will be described later in connection with the wiring diagram.

*Motor release bar—run-in or single cycle of operation*

The first depression of the motor release bar feeds a card to the viewing station. After the amount is set up by the ten-key mechanism and the drum has been stopped at the selected compartment position the motor release bar 175 (Fig. 1) is again depressed. This will cause feeding of the first card from the viewing station to the punching station, the punching of this card, and a second cycle to cause feeding of a following card to the viewing station and the punched card to the selected compartment determined by the first card fed to the viewing station in the run-in cycle. As best shown in Fig. 1 the motor release bar 175 is positioned exteriorly of the cabinet of the machine for a manual depression.

The motor release bar 175 (Fig. 19) is mounted upon and carried by a slidably mounted key stem 296 carrying a contact roll 297 of insulation which, when the key stem is depressed, closes contacts 299 and opens contacts 298.

Opening of interlock contacts 298 (Fig. 25c) opens the circuit to the solenoid 115 to prevent starting the rotation of the sorting drum while the machine is being cycled, as will be explained for "run-in" and "two cycles" operations. Closure of contacts 299 completes, when the first card is fed from the magazine, a circuit from line side 591, through contacts 299 (Fig. 25d), and through the following relay and mechanical interlock contacts which will be described later but which are all normally closed, R4a relay contacts, contacts 143, R1b, R33b, R31b, R5d relay contacts now closed to clutch release magnets 301 to line side 590. R1b contacts prevent operation of the motor release bar 175 during the rotation of the sorting drum.

A parallel circuit extends through CB17 cam contacts, R30c relay contacts now closed, punch feed clutch magnet 461 to line side 590. Thus, both the basic machine clutch magnet 301 (Fig. 19) and punch clutch magnet 461 (Fig. 2) are energized simultaneously and the clutches will engage approximately together.

Secured to the constantly rotating motor-driven shaft 20 of the machine is a sprocket gear 302 (Fig. 10) around which passes an endless chain 304 (Fig. 1) driving a sprocket gear 305 attached to a shaft 306. Attached to shaft 306 if a gear 307 meshing with a gear 308 loosely mounted on the shaft 300 and to which gear 308 a ratchet wheel 303 (Fig. 19) is fastened. Attached to the shaft 300 is a disk 309 pivotally carrying a spring-pressed clutch pawl 310 having a tail 311 normally engaged by a shoulder or a hook 312 of a clutch control arm 313. By means of a link 314 the clutch control arm 313 is connected to an arm 315 by a pin 316 carried by said arm 315 engaging a slot 317 in the end of the link 314, said arm 315 being secured to a rock shaft 319 and also having a slot receiving a pin 318 carried by the key stem 296. Attached to rock shaft 319 is a plate 345 carrying a pin 346 receiving a shoulder 347 of a spring-urged detent or latch plate 348 when the motor release bar 175 is depressed to latch it depressed. At the end of the cycle a hook 350 of link 277 will strike a finger 349 of detent plate 348 to unlatch the motor release bar 175.

From Fig. 19 it will be seen that the armature 330 of the magnets 301 is integral with the arm 313 so that the energization of magnets 301 will rock the clutch control arm 313 to remove the shoulder 312 from the tail 311, thereby permitting a spring 321 to rock the clutch pawl 310 into engagement with the ratchet wheel 303, thus rotating the drive shaft 300.

A about 254° of the rotation of shaft 300 a cam carried thereby will close cam contacts CC1A (Figs. 24 and 25d), thereby closing a circuit from line side 591 through R30a interlock contacts now closed to the R4 relay to line side 590. The latter will now transfer R4a relay contacts, thereby opening the circuit to the clutch control magnets 301 and even if the motor release bar is held depressed it will be seen that a spring 322 (Fig. 19) will rock the armature 330 and clutch release arm 313 so that at the completion of one revolution of the disk 309 and therefore shaft 300 the shoulder 312 of arm 313 will engage the clutch pawl 311 and disengage it from the ratchet wheel 303. In this case the slot 317 in the link 314 will permit the movement of the link 314 to the left without effecting the movement of the motor release bar 175.

Figure 25D:
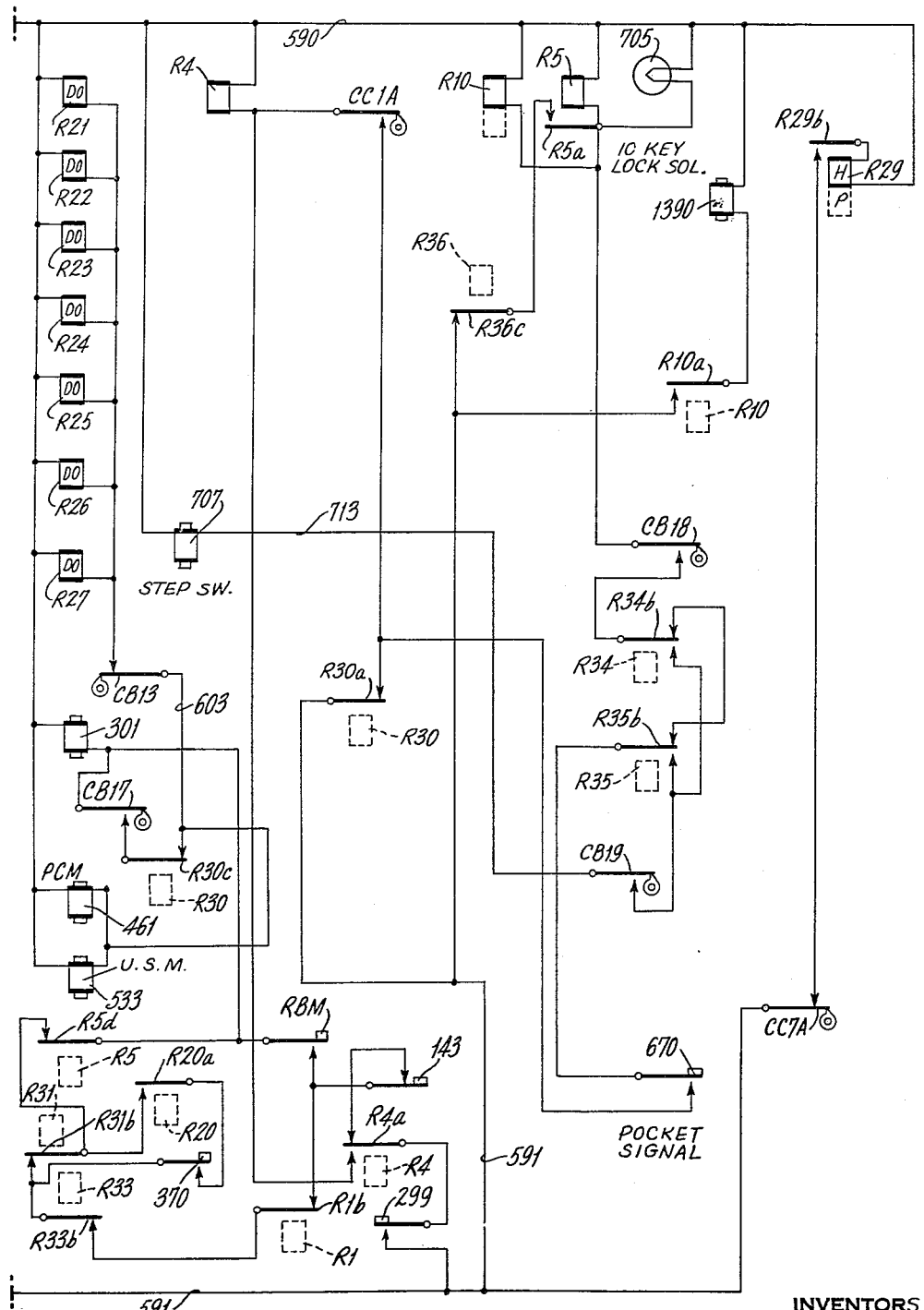

When the relay contacts R4a transferred it will be seen from Fig. 25d that a holding circuit for the R4 relay is closed to retain R4 relay energized, and its contacts R4a are kept transferred as long as the motor release bar 175 is held depressed and contacts 299 are closed. When the motor release bar 175 is released after a cyclic operation spring 323 will raise the motor release bar 175 and key stem 296, opening contacts 299 to cause the deenergization of the R4 relay, and the transfer of the R4a relay contacts back to normal. Thus, for the first card feed only a single revolution of the drive shaft 300 can be effected even though motor release bar 175 is held depressed. However, as will be subsequently described, after feeding of the first card to the viewing station, the next depression of the motor release bar will cause two cycles to ensue for each card after the first. This is effected by preventing the R4 relay from being energized because of opening of contacts R30a before a second cycle has been completed.

It should be further noted that when the motor release bar 175 is depressed the contact roll 297 carried by the stem 296 will permit contacts 298 to open, thus opening a circuit to the solenoid 115 and render the sorting drum selecting mechanism inoperative during the opening of these contacts, and when contacts 298 close to cause rotation of the sorting drum to select another compartment after the "run-in" cycle or at the end of the second of two cycles of operation.

Reference has been previously made to certain cam contacts and in this section to CC1a cam contacts. These, as well as all other cam contacts, are controlled by cams rotated by shaft 300, to open and close their contacts with the timing shown in the timing diagram of Fig. 24.

As shown in Fig. 19, armature 330 causes in an obvious manner, the closure of RBM contacts when clutch magnets 301 are energized. These contacts, as shown in Fig. 25d, shunt contacts R1b, R33b, R31b, R5d, some of which may open during the machine cycle, and thus RBM contacts provide for the proper energization of clutch control magnets 301 irrespective of their opening.

*Card feed and punching cycles*

In the preceding section it was described how, upon the first depression of the motor release bar 175, the first card from the magazine is fed to the viewing station and held there by means of the card stop 451, after which the sorting drum is rotated to select a compartment. Thereafter, the amount keys are depressed during the rotation of the sorting drum to set up in the machine the amount represented on the card brought into view. In order to punch and sort this card a second depression of the motor release bar 175 is made by the operator and two cycles of operation of the machine will then ensue. During the first cycle the first card is fed to the card punching mechanism and concurrently the following card is fed from the magazine to the viewing station and retained there. A second cycle automatically follows so that the card which has been punched by the punching mechanism during the first cycle is automatically fed into the selected compartment. Thereafter the sorting drum is rotated to select a compartment determined by the following card.

*Interlock to force an operator to set up ten-key keyboard before motor release bar 175 can be depressed*

When a card is in the viewing station an interlock is effective which forces an operator to set up an amount by the ten-key keyboard mechanism before the motor release bar 175 can be effective in its depression. In the above example this would be the prevention of the second depression of the motor release bar 175. When a card is fed into the viewing station ICL card lever contacts close at 170° (see Fig. 24) to energize the R20 relay coil and the R31P relay coil by a circuit from the line side 591 (Fig. 25b) through punch switch 592, ICL card lever contacts (Fig. 25a) relays R20 and R31P, to line side 590. A hold circuit for the R31P relay coil is from the line side 590 through R31H relay coil, R31a, R4b relay contacts through punch switch 592 to line side 591. When CC1A cam contacts close at 254° to pick up R4 relay, R4b relay contacts will deenergize the R31H relay coil during the run-in cycle at 254°. Therefore, R31H relay coil is held energized only between 170 to 254° of the run-in cycle. For other cycles since ICL is closed at 0° (see Fig. 24), R31 relay will be held energized to 254° when R4b contacts open. This overlaps the opening from 115° to 170° of ICL card lever contacts, thereby retaining the R31P and R20 relay coils, once they are picked up, continuously energized.

Referring to Fig. 25d the R31 relay coil, once it is energized opens the R31b relay contacts, thereby preventing the closing of the circuit to motor release bar clutch magnets 301, punch feed clutch magnets 461, and upper card stop magnet 533 which is in shunt with magnets 461, even if the motor release bar 175 is depressed. A series shunt circuit is provided across R31b contacts which consists of the R20a relay contacts and mechanically operated contacts 370.

Referring to Fig. 12 there will be seen that these contacts 370 are opened by the right end of the escapement rack 265 when the pin carriage is returned to home position. When the pin carriage escapes at least one step to the left in setting up one digit, contacts 370 close.

It is obvious, therefore, that a card should be in the viewing station and at least a digit setup in the ten-key keyboard mechanism in order that the motor release bar 175 be effective when depressed.

*Release of first card in viewing station*

The release of the first card in the viewing station is effected by the lateral movement of the card stop 451 when magnet 533 is energized. Referring to Fig. 25d, it will be observed that the upper card stop control magnet 533 is in shunt with the punch clutch magnet 461 so that early in the first cycle said magnet 533 is energized to attract its armature 532 and move the card stop 451 out of engagement with the leading edge of the first card. The card is now free to be fed into the punching mechanism by the set of rollers 449—450 which are continuously rotating, but of the slip type. Said rollers feed the card to rollers 441—442 which are continuously running but not of the slip type which latter rollers feed the card to the bite of rollers 431—432 which are continuously rotating and also of the slip type. This will project the leading edge of the card against card stop 433, thus retaining the first card in the punching mechanism. The card arrives at the punching mechanism at approximately 144° of the first cycle and the card is retained here during the punching operation to about 231° after which it is released for further downward movement to the feed rollers in the chute of the sorting mechanism of the basic machine. The punched card arrives at said feed rollers at about 360° of the first cycle.

*Initiation of second cycle automatically*

Early in the first cycle at about 19° (see Fig. 24) card lever 526 is rocked to close the LCL contacts which closes a circuit from the line side 591, through punch switch 592, LCL card lever contacts (Fig. 25a) to the R29P relay coil to the line side 590. Card lever 526 will close LCL contacts between 19 to 144° of the first cycle (see Fig. 24). A hold circuit for this relay is from the line side 590, R29H relay coil (Fig. 25d), R29b relay contacts and cam contacts CC7A to the line side 591. This hold circuit will retain R29 relay energized to 10° of the next cycle.

R29d relay contacts open to prevent picking up of the R3 relay which is the reverse control relay.

It has been explained that the release bar clutch magnet 301 and the punch clutch magnet 461 are energized simultaneously. However, their clutch teeth may not be in synchronism and there will be a variation in time when the punch clutch is engaged. They will engage approximately together but actual synchronism does not occur nor is it necessary. Due to the roving teeth of the ratchet wheels of both clutches the punch feed clutch may be engaged dissynchronously and accordingly the card to be punched may arrive in the punching mechanism (Fig. 5) 22½° before or 20° after the nominal arrival time of 144° at the card stop 433. Accordingly, there may be a variation in the timing of the card levers as shown in the timing diagram which is taken into consideration in the design of the electrical circuits.

At 150° CB8 cam contacts close to complete a circuit from the line side 591 to punch switch 592, CB8 cam contacts (Fig. 25a), through R29c contacts, to R30P relay coil to the line side 590, R30d contacts providing a hold circuit until CB8 opens at 200°. A further hold circuit for R30H relay coil is from the line side 590 through R30H relay coil, R30b relay contacts, CB9 cam contacts, through punch switch 592 to line side 591. The CB8 cam contacts hold R30P relay coil through R30d contacts to 200° but CB9 cam contacts take over when they close at 175° and hold the R30 relay coil energized up to 145° of the next cycle.

Since the R30 relay coil is energized and its contacts R30a (Fig. 25d) having opened at 150° they are open between 254 to 280° of the first cycle, the closure of CC1A cam contacts during this time will be ineffective to pick up the R4 relay coil and since this non-repeat R4 relay is now ineffective the clutch (Fig. 19) of the basic machine will be held engaged even if the motor release bar 175 is up and the machine will go through another cycle.

In the first run-in cycle the R30c relay contacts are closed between 2° to 137° when CB17 cam contacts (Fig. 25d) close to energize clutch magnet 461 as well as the upper card stop magnet 533. The sorting drum rotates to a new position as a result of the analysis of the card fed to the analyzing station during this run-in cycle. In the second cycle (first cycle of a pair of cycles) R30c contacts are closed in order that the first card in the viewing station can be released to be fed to punching station, and the second card in the magazine can be fed to the viewing station. While LCL contacts close at 2 degrees of this cycle the R30 relay is not energized until 150 degrees of the cycle. Therefore, R30c contacts have remained closed to 150 degrees of this cycle to permit feeding the first and second cards. In the third cycle or second cycle of a pair of cycles during the time that the CB17 cam contacts are closed R30c relay contacts are open and thus the upper card stop magnet 533 is not energized and card stop 451 is retained in the card stopping position to retain the card fed in the first cycle in the viewing station. Also, since card feed clutch magnet 461 is not energized at the end of the second cycle of a pair of cycles, the punch clutch will latch up after a second cycle of operation.

*Circuits for energizing roll lift magnet 540 and side register magnet 550 for effecting lateral registration of a card*

In the preceding section designated "Lateral Registration of Card" the means provided for effecting a lateral registration of the card while it is in the punching mechanism was described. The circuit for energizing the control magnet 540 is from the line side 591, through the punch switch 592, CB11 cam contacts (Fig. 25a), magnet 540, to the line side 590. Magnet 540 moves rollers 432 from the card. Said magnet is energized between 120 to 160° of the first cycle and while the rollers 432 are separated from the card CB12 cam contacts close at 150° to complete a circuit from line side 591, punch switch 592, CB12 cam contacts, the magnet 550, to line side 590. The latter effects the lateral registration of the card as described and before the card punching is started at 170° of the cycle the rollers 432 again press on the card. At 225° CB12 cam contacts deenergize the side register control magnet 550 which is near the end of the punching operation completed at 232°.

At 230° CB10 cam contacts close an obvious circuit to the lower gate control magnet 536 which shifts the related lower card stop 433 (Fig. 5) so as to release the card after it has been punched. The punched card enters the last set of continuous running punch feed rolls 422 and 424 at approximately 245° to cause the feeding of the punched card into the chute of the basic sorting machine.

*Detection of failure to feed card to porper position in punching mechanism*

A signal is given to the operator in the event that the card has not been completely fed into the punching mechanism and when said card is in a proper position its trailing edge will clear the card lever 526 and contacts LCL will be normal. If it is in such improper position that it retains card lever 526 (Fig. 5) rocked and LCL card lever contacts transferred, a circuit is completed from the line side 591 through punch switch 592, transferred LCL card lever contacts (Fig. 25a) through CB15 cam contacts to the pickup coil of R33 relay to line side 590. A hold circuit is maintained from the line side 590 through R33H relay coil, R33c relay contacts now closed, R36d contacts now closed, through punch switch 592 to line side 591. A parallel circuit is also closed through a non-register signal lamp 600. Thus, a signal is given to the operator that the card was punched out of vertical registration. The light can be extinguished and R33 relay deenergized by depressing a reset button 601 (Fig. 25b) which completes an obvious circuit to the pickup coil of the R36 relay. This will cause the opening of the R36d relay contacts to deenergize the R33 relay and extinguish the signal lamp 600.

*Circuit for energizing dropout coils R21DO to R27DO*

After the storage relays R21–R27 have been utilized to select a desired compartment the respective unlatching or dropout magnets are energized during the first part of a cycle to restore their contacts to normal. This circuit extends from line side 591, through contacts 299 (Fig. 25d) and through the following interlock contacts all normally closed, R4a relay contacts, contacts 143, R1b, R31b, R5d relay contacts, CB17 cam contacts, R30c relay contacts now closed, wire 603, cam contacts CB13 to each of the unlatching coils R21DO to R27DO to line side 590. These coils are energized between 2–10° of the first run-in cycle, or in the first of each of the following two cycles of operation, and is effected, therefore, in a cyclic operation of the machine upon a depression of the motor release bar 175.

*Sorting compartment selection at the end of the second cycle of the two cycle operations*

It was explained how the sorting drum 10 was rotated at the end of the run-in cycle, and thereafter two-cycle operations take place when the motor release bar is again depressed. Cam contacts C1 close at 350° of the first of these two cycles to attempt to close, when a different compartment is to be selected after the run-in cycle; a circuit from line side 591, wires 593, 594 (Fig. 25c), R5c contacts now closed, R33a relay contacts now closed, contacts 118 now closed, to contacts 298 which are now open. It will be recalled that a mechanical latch shown in Fig. 19 holds the motor release bar 175 depressed and contacts 298 are kept opened up to about 352° of the first of these two cycles. Also, since R4 relay is not energized at the end of the first cycle in the two-cycles operation of the machine the clutch magnets 301 will remain energized and the motor release bar 175 will be held depressed by the energized magnets 301 to keep contacts 298 open during the closure of C1 cam contacts between the first and second cycles (see Fig. 24). At the end of the second of the two cycles, when non-repeat R4 relay is energized, as in the basic machine, and as previously described herein for the run-in cycle, the deenergization of magnets 301 and release of the motor release bar 175 enable contacts 298 to close prior to 350° when C1 closes. The circuit is now extended through closed contacts 298, C1 cam contacts, R1b contacts now closed, to reel stop solenoid 115, to line side 590. As described in the section "Card Sorting Mechanism" the drum will be initiated in its rotation at the end of the second of the two cycles of operation. During this rotation of the drum the amount keyboard is operated to set up the amount on the card which is now in view at the viewing station.

*Differentially operated operating mechanism controlled by the ten-key setup mechanism for setting punching mechanism*

The basic machine includes a setting mechanism which is controlled by the ten-key keyboard for effecting entries in a selected totalizer, setting up the different printing mechanisms, etc., and in order that the present improvements can be more clearly understood there will now be described how the ten-key keyboard mechanism controls the differential movement of control slides 272 to set up the punching mechanism of the present invention. It will be clear from Fig. 14 and as previously described that as the setup slides 238 are released for differential positioning and are also moved laterally step by step to the left, the square studs 270 carried thereby come into the plane of the hooks 271 of the control slides 272. After the desired digits have been set up one or more of the setup slides 238 will be moved to the left by the carriage for securing this relationship. The amount to be punched in the card is five columns which is less than the denominational capacity of the basic machine which is nine orders, and for this reason it is necessary that when certain slides 238 are not set up that the associated control slides 272 be retained in their normal forward position or, otherwise, under the action of springs 334 (Fig. 20) connected to control slides 272 they will move rearwardly improperly.

A stop bar 325 is attached (Fig. 14) to a plate 352 (Figs. 12 and 14) attached to an arm which is secured to the rock shaft 230 carried by the pin carriage. Thus, the stop bar 325 is carried by the pin setup carriage and moves step by step as the keys are successively operated. Attached to the shaft 230 at the other side (see Fig. 18) is a bell crank latch arm 354 to which is connected a spring 355 which normally retains the stop bar 325 in elevated position to prevent movement of the control slides 272 associated with unkeyed columns. The home or right-hand position of bar 325 is such that if no digits are set up it will engage the hooks 271 of all the control slides 272 when the latter are lowered; but since the locking bar 325 moves step by step its right-hand end will pass out of locking cooperation with one or more of the right-hand control slides 272, depending upon the number of digits which are set up. For those setup slides 238 which are not moved the bar 325 will have a locking relationship with associated control slides 272 so that upon lowering of all the control slides 272 at the beginning of the first half of the cycle under control of cam 338 secured to shaft 300 (Fig. 18) the hooks 271 of these control slides 272 will immediately engage said locking bar 325 and the latter will prevent them from moving rearwardly. Hence, in punch setting operations the locking bar 325 will lock the control slides 272 of those orders in which no digit or digits are to be entered. The remaining control slides 272 will move rearwardly during the first half of the first cycle to commensurate digit positions, depending upon the particular digits set up in that order by the arrangement now to be described in detail.

Referring to Figs. 18 and 20, the control slides 272 are slidably mounted in a frame including side plates 326 and have their right ends slotted to embrace a rod 327 pivotally supporting the frame. The left ends of the slides 272 are also slotted and are slidably mounted on a rod 328 carried by the side plates 326 of the frame. Each of the control slides 272 carries a stud 329 at its right end which stud is embraced by the bifurcated end of one arm of a bell crank 330 loosely pivoted on a rock shaft 331.

The arms 330 are normally pressed against a bail rod 332 which is carried between a pair of arms 333 secured to the rock shaft 331 by springs 334 stretched between projections 335 at the lower sides of control slides 272 and rods 336 carried between the arms 333.

One of the frame plates 326 carries a roller 337 (Fig. 18) which, by the weight of the frame, engages the profile of a cam 338 secured to the main drive shaft 300. During the rotation of cam 338 beginning at 40° the left end of the frame drops to bring the hooks 271 into correlation with the square stop studs 270 so that by the movements of the control slides 272 to the right urged by springs 334 under control of the bail rod 332 the control slides 272 will move to the right until each hook 271 engages the correlated stop stud 270.

The rocking movement of the bail rod 332 is effected by the following described means illustrated in Fig. 20. It includes a pair of complementary cams 340 fast on the drive shaft 300 cooperating with rollers carried by a curved arm 341 pivotally supported on a rod 342. The link 343 connects the curved arm 341 with an arm 344 secured to the rock shaft 331. At each rotation of shaft 300 the cams 340 rock the arm 341 first clockwise and through the link 343 rock the arm 344 and rock shaft 331 counterclockwise until the control slides 272 are stopped in differential positions. The bail rod 332 continues its counterclockwise movement after the control slides 272 are arrested and thus merely stretching the springs 334 of these slides if they do not go to extreme positions.

The cams 340 then merely reverse this movement, rocking the arm 341 counterclockwise and through the link 343 and arm 344 rock the shaft 331, the arms 333 and rod 332 clockwise to restore the control slides 272 to their normal positions.

Referring to Fig. 20 the nearly horizontal arm of each bell crank 330 is also bifurcated and straddles a stud 375 carried by a vertically disposed slide 376. There is a bell crank 330 and vertical slide 376 for each control slide 272. The vertical slides 376 are guided near their upper end by combs, one of which is designated in Fig. 20 by 377. The slides 376 carry printing members 382 to print the items entered, as is known in the basic machine.

A series of type segments 556 of the same order for a plurality of compartment printers of the basic machine are mounted on a series of shafts 361. The segments 556 are provided with arms 363 (Fig. 7), each of which arms for a vertical group is operatively connected to the same link 555 so that when one of said segments 556 is selectively adjusted all segments 556 of that particular order and in the particular vertical group are correspondingly adjusted.

One of the segments 556 of each group is provided with a segmental gear 365 (Figs. 7 and 20) which meshes with a segment 366 on one end of the double arm 367 pivoted on a shaft 368. Each double arm 367 has a pin and slot connection 369 to the associated slide 376. Thus, when these slides 376 are adjusted upwardly the double arms 367 are rocked, segments 366 rock segments 365, thus correspondingly adjusting through links 555 the type segments 556, said links 555 being elevated against the action of return springs 545 (Fig. 7) connected to said links 555. The connections from links 555 to the punch interposers or punch pin selectors were previously described in connection with Figs. 5 and 7, and need not be repeated.

*Means for feeding punched cards into selected compartment*

The check feeding mechanism of the basic machine in well known and is fully shown and described in the patent to S. Brand et al., No. 2,146,695 and, therefore, the description given herein of this mechanism is only as much as is necessary to understand the changes made in the present machine to feed punched cards to selected sorting compartments. The arrangement is shown in Figs. 21 and 22.

While the sorting drum 10 is being positioned according to the district number sensed on the card the ten-key keyboard mechanism is being operated to set up the amount read on the card. Thereafter, as described, the motor release bar 175 is then depressed to cause two cycles of operation to effect the punching of the card and feeding into the selected compartment.

The punched cards are ejected from the punch by the rollers 422, 424 and are directed by guide plates of a chute 605 (Figs. 3, 4 and 21) into a chute 604 of the basic machine to the bite of a plurality of pairs of large feed rollers 612 which then feed to the card when rotated to pairs of smaller rollers 613 (Figs. 21 and 22). Feed rollers 612 and 613 normally occupy the position with relation to the chute 604 and sorting drum in which they appear in Fig. 21. In general, the rollers 612 and 613 are carried by frame plates 619 of a pivoted frame which is rocked clockwise during the rotation of these card feeding rollers to feed a punched card into a selected compartment to the position shown in Fig. 22. The pairs of rollers 612 which are in frictional contact are secured to the respective drive shafts 607 and 608, the shafts 607 and 608 being carried by the spaced frame plates 619 which are secured to a rock shaft 620.

Shaft 617, which carries the rearward ones of the smaller feeding rollers 613, is also carried by the side frame plates 619, whereas the shaft 618 which carries the forward ones is carried by arms 616 loosely pivoted on shaft 607 and which are urged by springs (not shown) to bring the associated pairs of feeding rollers 613 together to resiliently seize the punched card fed therebetween.

To rock shaft 620 there is secured a cam follower arm 622 carrying rollers cooperating with a pair of complementary cams 623 secured to the main drive shaft 300, which, it will be remembered, receives two complete counterclockwise rotations at each operation of the machine, after a run-in operation. At the proper time in the cycle the cams 623 rock the shaft 620 and the frame plates 619 clockwise to bring the rollers 612 and 613 into close proximity with regard to the selected compartment. At the same time a gear 625 fast on the shaft 300 rotates the rollers 612 and 613 oppositely through the following described train of gears: The gear 625 drives an intermediate gear 626 mounted on a stud 627. The gear 626 meshes with a gear 628 loose on the shaft 620, which gear 628 meshes with a gear 629 fast on the shaft 607. A gear (not shown) but in front of gear 629 also fast to the shaft 607 meshes with a gear 631 fast on the shaft 608. The counterclockwise rotation of the gear 625 through the train of gears 626 and 628 rotates the gear 629, the shaft 607 and the respective feeding rollers 612 fast thereon in a clockwise direction, and also rotates the gear 631 and shaft 608 and the respective feeding rollers 612 on this shaft in a counterclockwise direction. By a suitable gear drive from drive shaft 608 and fully shown and explained in the patent to S. Brand, No. 2,146,695, the feed rollers 613 on the shaft 617 are rotated counterclockwise and the feed rollers 613 on shaft 618 rotated in a clockwise direction, to thus feed the card into the selected compartment.

As the punched cards are fed into the compartment by rollers 613 they are held between a check retainer plate 642 and a series of fingers 643 which are secured to a rod 644 carried by a pair of arms 645. The arms 645 are secured to a rock shaft 646 pivotally supported on brackets 647 (only one of which is shown) secured to a sub-base. Suitable springs (not shown) are provided to normally urge the arms 645 clockwise, pressing rollers 649 carried by the arms 645 against cams 650 fast on the shaft 300.

The fingers 643 are normally in the Fig. 21 position, and when the shaft 300 and consequently the cams 650 are rotated counterclockwise the contour of the cams 650 permits said suitable springs to rock the arms 645 quickly clockwise from the Fig. 21 position to the position in which they appear in Fig. 22 to position the fingers 643 into the compartment. Arms 654 are secured to the shaft 644 and are urged by springs 656 attached to the extensions of fingers 643 to cause the arms 654 to be urged against a guide rod 655 so that as the fingers 643 are moved into tthe compartment they are guided by the arms 654 cooperating with grooves in said guide rod 655.

When the selected compartment comes into a punched card receiving position an arm 659 comes to rest adjacent a roller 660 carried by an arm 637 which is clamped to rock shaft 620. After the fingers 643 are moved into the compartment, as shown in Fig. 22, the shaft 620 rocks arm 637 to cause roller 660 to rock arm 659. The arm 659 is connected to an arm 662 by a sleeve 663 so as to rock arm 662 counterclockwise against the action of a spring 664. The card retainer plate 642 is pivoted at 665 to said arm 662 and thus shifts the check retainer plate 642 from the position in which it appears in Fig. 21 to the position in which it is shown in Fig. 22. By means of slots 666 in the card retainer plate 642 the latter is moved past the fingers 643 which are now in the compartment so that the incoming card may be fed between the card retainer plate 642 and fingers 643 by the rollers 613 which are now rotating. "Punched card" in Fig. 22 indicates a punched card fed in a compartment to show how it is fed between the plate 642 and fingers 643.

After the punched card is fed in the compartment between the fingers 643 and the retainer plate 642, the cams 650 restore the arms 645 to their original position withdrawing the fingers 643 from the compartment. The cams 623 then rock the side frames 619 counterclockwise, carrying the feed rollers 612 and 613 outwardly to their normal positions and this allows the spring 664 to carry the retainer plate 642 against the stack of cards to firmly hold the card fed into the compartment against the cards already in the compartment, if they are there.

*Means for detecting a full compartment condition*

Means are provided to detect when any of the card sorting compartments utilized is completely filled. This means includes contacts 670 (Fig. 23a) adapted to be shunted by a toggle operated switch plate 669 when a compartment is full. A cam 671 is fast on the shaft 300 and cooperating with the cam 671 is a roller 672 on the free end of a follower arm 673 of a lever loosely pivoted on the shaft 620. The other arm 674 of the lever is bent over and down in order to clear other mechanism and pivotally carries at 376 a curved lever 677 having one of its arms 678 provided with a block 679 in the plane of a projecting surface 680 on the arm 662.

The other arm 675 of the lever 677 has at its upper end a pin and open slot connection to a double arm 682 which has a link connection 681 to a switch operating arm 683 of a toggle switch of a well known construction. When the toggle switch is operated switch plate 669 is shifted to shunt contacts 670. The details of the switch are shown in Fig. 23a and all parts thereof are mounted in a casing 689 secured to an extension 690 of the lever 673—674.

When the cams 623 (Fig. 21) operate to rock the frames 619 counterclockwise withdrawing the feed rollers 612, and 613 from the position in which they appear in Fig. 22 to their normal position (Fig. 21), springs 664 immediately rock arms 662 clockwise until they are arrested by the plate 642, striking the stack of cards. Shortly thereafter the cam 671 (Fig. 23a) rocks the lever 673—674 clockwise against the action of a connected spring 700 carrying the lever 677 therewith, the lever 677 maintaining the same relation to the arm 674 and with the switch box 689 as shown in Fig. 23.

On its clockwise travel the block 679 will strike the surface 680 if a sufficient number of cards have previously been sorted into the particular compartment selected, and rock the lever 677 slightly counterclockwise about its pivot 676. As the number of cards in the compartment increases the lever 677 will be rocked farther and farther in a counterclockwise direction until eventually when the card capacity of the compartment is reached the movement of the lever 677 is sufficient to rock the lever 682 and shift link 681 to the right so that the toggle action of the switch will cause switch plate 669 to shunt the contacts 670. Upon the restoration of the lever 673—674, due to the previous counterclockwise rocked position of lever 677, the arm 678 of lever 677 will strike a fixed pin 708 and lever 677 will now be rocked clockwise, double arm 682 in the same direction, link 681 to the left, reversing the action of the toggle switch to open contacts 670.

*Operation controlled by full pocket switch 670 when any of the pockets 1 to 12 are filled with punched cards*

As previously described, switch 670 is closed whenever any of the sorting compartments including those numbered 1–12 are filled and when such contacts are closed a circuit is completed at 300° when CB18 cam contacts close, from the line side 591 through R30a contacts now closed (Fig. 25d), switch contacts 670, through R35b and R34b relay contacts now in the normal position shown, CB18 cam contacts to R5 relay coil and coil of the R10 relay in shunt therewith, and also a signal light 705 also in shunt with R5 and R10 relays to the line side 590. A holding circuit for these is established through R5a relay contacts, R36C relay contacts to the line side 591. Signal light 705 is in full view of the operator indicating that one of the compartments 1–12 is completely filled with punched cards, indicating that the operator should remove the cards.

Energization of the R5 relay coil will open R5c relay contacts (Fig. 25c) preventing any change in position of the sorting drum. The R5d relay contacts (Fig. 25d) will open the motor release bar energizing circuit, preventing a cyclic operation of the machine including the card feed and card punching mechanism. The R10 relay closes the R10a relay contacts and by an obvious circuit energizes the magnet 1390 (Figs. 25d and 16) which, it will be recalled, causes the locking of the ten-key keyboard. The machine is completely inoperative as to the manual operation of these parts of the machine until released by the depression of the reset push button 601 (Fig. 25d).

When the sorting compartment is empty the reset push button 601 is depressed to close its contacts and pick up the R36 relay as previously described. This will open the R36c relay contacts to deenergize the R5, R10 relays and extinguish the signal light 705.

*Successive selection of sorting compartments 13–22 controlled by switch 670*

In view of the fact that punched cards having the local district designation No. 2 appear in greater number than punched cards bearing other district designations, it is preferable to allocate a plurality of compartments for receiving such cards in succession when the preceding compartment has been filled. This selection mechanism employs a stepping switch which is of a type well known in the telephone art and reference may be had to U. S. patent to Bohlman, No. 1,569,450, which shows and describes a switch of this type in detail. Accordingly, the stepping switch of the present machine is shown only diagrammatically in Fig. 25c. Such switch includes a motor magnet 707 which, upon each energization and deenergization actuates pawl 710 to advance the switch arm 597 step by step over the switch contacts designated 13-22. It is also provided with a release or reset magnet 706 which, when energized, disables a retrograde preventing pawl 709 and the actuating pawl 710 and allows the switch arm 597 to return to normal position under the power of a spring which wound up upon step by step advance of the wiper. Such stepping switches are customarily provided with so-called off-normal contacts 711 which are normally open but are closed whenever the switch moves to the 14-22 contact positions.

In the position that switch arm 597 is shown the sensing of the local district designation No. 2 causes the transfer of the R22-1 relay contacts, and the circuit by wire 596 is completed through the switch arm 597 to the No. 13 contact point to wire 43₁₃ to select the No. 13 sorting compartment. Upon each occurrence of a card bearing the No. 2 designation, it is disposed in sorting compartment No. 13 until the full compartment signal switch 670 is closed in the manner previously described. When the circuit is first completed through the switch arm 597 to select the 13 sorting compartment, a supplemental circuit is completed by wire 712 (Fig. 25c) connected to said switch arm to the pickup coil of the R35 relay to the line side 590. A hold circuit for such relay is from the line side 590, through R35H relay coil (Fig. 25b), R35a hold contacts, R6b relays contacts now closed, through punch switch 592 to the line side 591. The holding circuit for R35 is established until the reel changes a position insuring that R35b relay contacts (Fig. 25d) will be in transferred position when a punched card which would cause sorting compartment No. 13 to be completely filled causes closure of contacts 670 to close a circuit as follows: From the line side 591, through R30a relay contacts now closed, full compartment switch contacts 670, R35b relay contacts now transferred, CB19 cam contacts, wire 713 to the motor magnet 707 to the line side 590. This will cause switch 597 to move one step so that it will now rest on the No. 14 contact point. During the successive card sorting operation when District No. 2 designation is sensed, it will cause the completion of the circuit through the No. 14 contact point to thereby select sorting compartment No. 14 for receiving successive cards until it is completely filled. The above described operation will then be repeated, causing the selection of the No. 15 compartment, etc. and then compartments No. 16 to 22 in succession.

However, when the last selectable compartment No. 22 is filled a full pocket designation circuit is completed which is described as follows:

*Operation by full pocket switch 670 when sorting compartment No. 22 is completely filled*

For the first and each successive time that the No. 22 sorting compartment is selected due to the position of switch arm 597 on No. 22 contact point, a circuit will be completed to the pickup coil of the R34 relay (Fig. 25c) to the line side 590. R34 closes R34c contacts to complete a circuit from No. 22 switch point, through R34c contacts and a wire connected to No. 22 brush 42 to select compartment No. 22. A holding circuit for the R34H coil is from the line side 590 through R34H (Fig. 25b), R34a contacts, R35c contacts and the aforementioned reset contacts 711, which are now closed since the switch arm 597 is off normal with respect to the 13 contact point, to the line side 591.

Referring now to Fig. 25d the R34 and the R35 relay transfer their respective "b" contacts, thus completing a circuit when compartment No. 22 is filled from the line side 591, through R30a relay contacts, contacts 670, thence through R35b and R34b contacts now transferred, CB18 cam contacts which close at the time contacts 670 close, to the R5, R10PL relay coil and signal light 705. As previously described, the latter will give an indication to the operator that No. 22 compartment is now filled and furthermore the machine will be rendered inoperative until the reset button 601 is pushed. As previously described, this will cause the energization of the R36P relay coil and a holding circuit will be then established from the line side 590, through R36H relay coil (Fig. 25b), R36b hold contacts, R34a contacts now closed, R35c contacts now closed, contacts 711 to the line side 591. At the same time a circuit will be completed through R36a relay contacts to the reset magnet 706. Energization of the latter will cause the step by step switching distributor to be restored to normal and when switch arm 597 returns to the No. 13 contact point position contacts 711 will open, thereby breaking the holding circuits of R36 and R34 as well as deenergizing the reset magnet 706.

*Clearing out compartments 13 to 22 before they are all filled*

At times it may be necessary to take all the punch cards out of the sorting compartments 13 to 22 before they are filled. In this instance a push button 714 is depressed which, by an obvious circuit, energizes the restoring magnet 706. This will cause the restoration of the step by step distributor switch to normal so that sorting of cards bearing the local district designation No. 2 may again be performed, starting at compartment No. 13.

*Sorting of cards in the absence of a designation*

It is obvious that with the present circuit arrangement in the absence of a district numbering designation on a card or the failure to sense a perforation in the column to be sensed, none of the relays R21 to R27 will be energized and the circuit will be extended through their normally closed contacts and by a wire 715 (Fig. 25c) to the No. 2 brush 42, thereby causing the No. 2 compartment to be selected.

While there have been shown and described and pointed out the fundamental novel features of the invention, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a combined sorting and accounting machine having a keyboard which is operable by an operator to effect punching of items on records to be sorted according to their designations, a punching mechanism, a plurality of sorting compartments, means for feeding a record to a viewing station, and thereafter to a punching station, means for selecting under control of the keyboard punches corresponding to the item represented on the record as it is visible in the viewing station, means for sensing a compartment selecting designation as the record is fed to the viewing station, means under control of said sensing means to select a compartment appropriate to the designation sensed while said keyboard is being operated by the operator to select said punches, means initiated in operation by the operator for causing the operation of the selected punches to punch said card and the aforesaid feeding means to feed a record to the punching station and a following record to the viewing station, and the operation of further feeding means to feed the punched record in the punching station into the selected compartment.

2. In a combined sorting and accounting machine having a keyboard which is operable by an operator to effect punching of items on records to be sorted according to their designations, a punching mechanism, a carrier for a plurality of sorting compartments, means for feeding a record to a viewing station, and thereafter to a punching station, means for selecting under control of the keyboard punches corresponding to the item represented on the record as it is visible in the viewing station, means for sensing a compartment selecting designation as the record is fed to the viewing station, means under control of said sensing means to determine the extent of movement of said carrier to a stop position to place a selected compartment appropriate to the designation sensed in record receiving position while said keyboard is being operated by the operator to select said punches, means initiated in operation by the operator for causing the operation of the aforesaid feeding means to feed a record to the punching station and a following record to the viewing station, and the operation of additional feeding means to feed the punched record into the selected compartment at record receiving position, and interlock means to prevent the operation of said last named means until said carrier has been moved to a stop position to place a selected compartment in record receiving position, and until said keyboard is operated by the operator.

3. In a combined sorting and accounting machine having a keyboard which is operable by an operator to effect punching of items on records to be sorted according to their designations, a punching mechanism, a rotatable carrier for a plurality of sorting compartments, means for selecting under control of the keyboard punches corresponding to the item represented on the record as it is visible in a viewing station and while said carrier is being rotated, means for sensing a compartment selecting designation as the record is fed to the viewing station, means for storing up a compartment selecting designation under control of said sensing means, means under control of said storing means to determine the extent of movement of said carrier to place a selected compartment appropriate to the designation sensed in record receiving position while said keyboard is being operated by the operator to select said punches, means initiated in operation by the operator for causing the operation of the feeding means to feed a record to the punching station, a following record to the viewing station, the punching of said record by the selected punches, and for feeding the punched record into the selected sorting compartment at record receiving position, interlock means to prevent the operation of said last named means until said carrier has been moved to place a selected compartment in record receiving position, and until said keyboard is operated by the operator, further interlock means to prevent the rotation of said carrier to place a selected compartment in record receiving position until the completion of the operation of the means initiated in operation by said operator, and means effective upon completion of the operation of means initiated in operation by the operator for causing the rotation of said carrier to select a compartment determined by said storing means.

4. In a combined sorting and accounting machine having a keyboard which is operable by an operator to effect punching of items on records to be sorted according to their designations, a record punching mechanism, a rotatable sorting drum carrying a plurality of sorting compartments, means for feeding a record in view at a viewing station, a punched record to a selected compartment, and to effect the operation of said punching mechanism during a single operation of the machine, a keyboard, means under control of said keyboard to select punches of said punching mechanism according to the amounts on the record in view, means for sensing a designation of a record as said record is fed to said viewing station to determine the compartment to be selected, means to effect a rotation of said sorting drum while the keyboard is being operated and to an extent determined by said sensing means to select a compartment to subsequently receive a punched record, and means comprising sets of feeding rollers for feeding the record from said viewing station, to said punching mechanism, and thereafter to said selected compartment.

References Cited in the file of this patent
UNITED STATES PATENTS

| | | |
|---|---|---|
| 1,298,971 | Lasker | Apr. 1, 1919 |
| 1,930,266 | Ford | Oct. 10, 1933 |
| 1,973,246 | Bryce | Sept. 11, 1934 |
| 2,000,214 | Campbell | May 7, 1935 |
| 2,124,178 | Lasker | July 19, 1938 |
| 2,131,912 | Brand | Oct. 4, 1938 |